United States Patent
Matsunobu et al.

(10) Patent No.: US 10,944,960 B2
(45) Date of Patent: Mar. 9, 2021

(54) FREE-VIEWPOINT VIDEO GENERATING METHOD AND FREE-VIEWPOINT VIDEO GENERATING SYSTEM

(71) Applicant: Panasonic Intellectual Property Corporation of America, Torrance, CA (US)

(72) Inventors: Toru Matsunobu, Osaka (JP); Toshiyasu Sugio, Osaka (JP); Satoshi Yoshikawa, Hyogo (JP); Tatsuya Koyama, Kyoto (JP); Yoichi Sugino, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/534,228

(22) Filed: Aug. 7, 2019

(65) Prior Publication Data
US 2019/0364265 A1    Nov. 28, 2019

Related U.S. Application Data

(63) Continuation of application No. PCT/JP2018/004223, filed on Feb. 7, 2018.
(Continued)

(51) Int. Cl.
*H04N 13/282* (2018.01)
*H04N 13/279* (2018.01)
(Continued)

(52) U.S. Cl.
CPC ......... *H04N 13/282* (2018.05); *H04N 13/194* (2018.05); *H04N 13/25* (2018.05); *H04N 13/279* (2018.05)

(58) Field of Classification Search
CPC .. H04N 13/282; H04N 13/279; H04N 13/194; H04N 13/25; H04N 13/117; G06T 2207/10028
See application file for complete search history.

(56) References Cited

U.S. PATENT DOCUMENTS

| | | | | |
|---|---|---|---|---|
| 5,047,845 A | * | 9/1991 | Tomlinson | G01J 9/02 348/40 |
| 5,495,576 A | * | 2/1996 | Ritchey | G06T 17/00 345/420 |

(Continued)

FOREIGN PATENT DOCUMENTS

| | | |
|---|---|---|
| JP | 9-218954 | 8/1997 |
| WO | 2014/077024 | 5/2014 |

OTHER PUBLICATIONS

Rasti, Iterative Back Projection based Image Resolution Enhancement, 2013 (Year: 2013).*

(Continued)

*Primary Examiner* — Charles L Beard
(74) *Attorney, Agent, or Firm* — Wenderoth, Lind & Ponack, L.L.P.

(57) ABSTRACT

A free-viewpoint video generating method includes obtaining a multi-viewpoint video including N videos of N viewpoints (N being an integer greater than 1), and generating a free-viewpoint video of a virtual viewpoint based on the multi-viewpoint video such that the free-viewpoint video shows target areas and has a first resolution higher than each of resolutions of the N videos, the virtual viewpoint being different from the N viewpoints. For each target area, the generating includes: referring to a three-dimensional model generated based on the N videos to specify N reference areas which are shown by the N videos and which correspond to the each target area in the free-viewpoint video; and calculating components of pixels to represent the each target area (Continued)

⊠ : FIXED CAMERA
◻ : FREE VIEWPOINT CAMERA (VIRTUAL CAMERA)

US 10,944,960 B2

Page 2 in the free-viewpoint video, based on components of pixels to represent the N reference areas in the N videos.

11 Claims, 19 Drawing Sheets

Related U.S. Application Data

(60) Provisional application No. 62/457,276, filed on Feb. 10, 2017.

(51) Int. Cl.
*H04N 13/194* (2018.01)
*H04N 13/25* (2018.01)

(56) References Cited

U.S. PATENT DOCUMENTS

| | | | | |
|---|---|---|---|---|
| 5,714,997 | A * | 2/1998 | Anderson | G02B 27/017 |
| | | | | 348/39 |
| 5,729,471 | A * | 3/1998 | Jain | H04N 13/139 |
| | | | | 725/131 |
| 5,850,352 | A * | 12/1998 | Moezzi | H04N 13/139 |
| | | | | 345/419 |
| 6,084,979 | A * | 7/2000 | Kanade | H04N 13/243 |
| | | | | 382/154 |
| 6,269,175 | B1* | 7/2001 | Hanna | G06T 5/50 |
| | | | | 382/107 |
| 6,327,381 | B1* | 12/2001 | Rogina | G06T 15/10 |
| | | | | 382/154 |
| 6,330,282 | B1* | 12/2001 | Miyazaki | H04N 5/145 |
| | | | | 348/E5.066 |
| 6,388,666 | B1* | 5/2002 | Murray | H04N 13/279 |
| | | | | 345/473 |
| 6,426,755 | B1* | 7/2002 | Deering | G06T 15/503 |
| | | | | 345/581 |
| 6,476,850 | B1* | 11/2002 | Erbey | H04N 13/243 |
| | | | | 348/51 |
| 6,573,912 | B1* | 6/2003 | Suzuki | G06T 17/10 |
| | | | | 715/757 |
| 6,836,286 | B1* | 12/2004 | Tachi | H04N 7/15 |
| | | | | 348/36 |
| RE40,326 | E * | 5/2008 | Fielder | G09G 5/363 |
| | | | | 345/519 |
| 7,830,369 | B2* | 11/2010 | Kageyama | H04N 7/015 |
| | | | | 345/204 |
| 8,175,161 | B1* | 5/2012 | Anisimov | H04N 19/436 |
| | | | | 375/240.05 |
| 8,823,771 | B2* | 9/2014 | Jeong | G06T 15/40 |
| | | | | 348/43 |
| 8,855,410 | B2* | 10/2014 | Fenney | H04N 19/46 |
| | | | | 382/162 |
| 8,976,224 | B2* | 3/2015 | Smith | H04N 7/157 |
| | | | | 348/14.09 |
| 9,294,757 | B1* | 3/2016 | Lewis | G06F 3/038 |
| 9,412,151 | B2* | 8/2016 | Ishii | G06T 5/003 |
| 9,489,774 | B2* | 11/2016 | Kruglick | G06T 19/006 |
| 9,497,380 | B1* | 11/2016 | Jannard | H04N 5/2254 |
| 9,573,062 | B1* | 2/2017 | Long | H04N 13/117 |
| 9,630,365 | B2* | 4/2017 | Frayne | G06T 11/00 |
| 9,728,012 | B2* | 8/2017 | Siddiqui | G06K 9/00208 |
| 9,998,664 | B1* | 6/2018 | Long | G06T 3/005 |
| 10,009,640 | B1* | 6/2018 | Lodato | H04N 5/38 |
| 10,271,040 | B1* | 4/2019 | Marchak, Jr. | G06K 9/00724 |
| 10,275,935 | B2* | 4/2019 | Holzer | H04N 5/265 |
| 10,284,753 | B1* | 5/2019 | Naik | G06T 7/596 |
| 10,356,393 | B1* | 7/2019 | Binns | H04N 5/23216 |
| 10,440,352 | B2* | 10/2019 | Hayasaka | G06T 5/50 |
| 10,659,822 | B2* | 5/2020 | Onuma | H04N 21/23436 |
| 10,791,285 | B2* | 9/2020 | Choi | H04N 5/265 |
| 2002/0024517 | A1* | 2/2002 | Yamaguchi | A63F 13/10 |
| | | | | 345/424 |
| 2002/0030675 | A1* | 3/2002 | Kawai | H04N 19/597 |
| | | | | 345/204 |
| 2002/0061131 | A1* | 5/2002 | Sawhney | G06T 7/97 |
| | | | | 382/154 |
| 2004/0130503 | A1* | 7/2004 | Hamagishi | H04N 13/32 |
| | | | | 345/6 |
| 2004/0233195 | A1* | 11/2004 | Bunnell | G06T 15/60 |
| | | | | 345/426 |
| 2005/0174428 | A1* | 8/2005 | Abe | A61B 1/05 |
| | | | | 348/65 |
| 2005/0230641 | A1* | 10/2005 | Chun | H04N 13/302 |
| | | | | 250/484.4 |
| 2006/0120593 | A1* | 6/2006 | Oshino | H04N 13/305 |
| | | | | 382/154 |
| 2007/0046776 | A1* | 3/2007 | Yamaguchi | H04N 13/398 |
| | | | | 348/53 |
| 2007/0110298 | A1* | 5/2007 | Graepel | H04N 13/207 |
| | | | | 382/154 |
| 2008/0146302 | A1* | 6/2008 | Olsen | A63F 13/211 |
| | | | | 463/7 |
| 2008/0192116 | A1* | 8/2008 | Tannin Michael | G06T 7/292 |
| | | | | 348/157 |
| 2009/0010530 | A1* | 1/2009 | Sumitomo | G06T 7/593 |
| | | | | 382/154 |
| 2009/0073324 | A1* | 3/2009 | Tan | H04N 5/2628 |
| | | | | 348/745 |
| 2009/0110305 | A1* | 4/2009 | Fenney | H04N 19/154 |
| | | | | 382/232 |
| 2009/0128549 | A1* | 5/2009 | Gloudemans | G06T 15/20 |
| | | | | 345/419 |
| 2009/0128568 | A1* | 5/2009 | Gloudemans | G06K 9/346 |
| | | | | 345/474 |
| 2009/0128577 | A1* | 5/2009 | Gloudemans | H04N 5/232945 |
| | | | | 345/582 |
| 2009/0128667 | A1* | 5/2009 | Gloudemans | G06T 7/13 |
| | | | | 348/241 |
| 2009/0315978 | A1* | 12/2009 | Wurmlin | G06T 7/20 |
| | | | | 348/43 |
| 2010/0060793 | A1* | 3/2010 | Oz | H04N 5/275 |
| | | | | 348/584 |
| 2010/0141780 | A1* | 6/2010 | Tan | H04N 9/3185 |
| | | | | 348/222.1 |
| 2010/0149338 | A1* | 6/2010 | Aggarwal | H04N 5/232 |
| | | | | 348/159 |
| 2010/0246896 | A1* | 9/2010 | Saito | G06K 9/00798 |
| | | | | 382/106 |
| 2010/0259595 | A1* | 10/2010 | Trimeche | H04N 21/21805 |
| | | | | 348/43 |
| 2011/0096136 | A1* | 4/2011 | Liu | H04N 7/144 |
| | | | | 348/14.07 |
| 2011/0128300 | A1* | 6/2011 | Gay | G06T 19/006 |
| | | | | 345/633 |
| 2011/0187832 | A1* | 8/2011 | Yoshida | H04N 13/361 |
| | | | | 348/46 |
| 2011/0216160 | A1* | 9/2011 | Martin | H04N 5/89 |
| | | | | 348/40 |
| 2011/0267344 | A1* | 11/2011 | Germann | G06T 15/205 |
| | | | | 345/420 |
| 2011/0274368 | A1* | 11/2011 | Kondo | G06T 3/4053 |
| | | | | 382/264 |
| 2011/0316963 | A1* | 12/2011 | Li | H04N 13/243 |
| | | | | 345/419 |
| 2012/0050256 | A1* | 3/2012 | Thiel | G06T 19/003 |
| | | | | 345/419 |
| 2012/0069146 | A1* | 3/2012 | Lee | H04N 19/597 |
| | | | | 348/43 |
| 2012/0114260 | A1* | 5/2012 | Takahashi | H04N 13/156 |
| | | | | 382/238 |
| 2012/0249831 | A1* | 10/2012 | Porter | H04N 5/23293 |
| | | | | 348/231.3 |
| 2012/0250980 | A1* | 10/2012 | Gillard | H04N 5/23206 |
| | | | | 382/154 |
| 2012/0293633 | A1* | 11/2012 | Yamato | G03B 35/10 |
| | | | | 348/47 |
| 2012/0329527 | A1* | 12/2012 | Kang | H04N 13/349 |
| | | | | 455/566 |

(56) References Cited

U.S. PATENT DOCUMENTS

| | | | |
|---|---|---|---|
| 2013/0016097 A1* | 1/2013 | Coene | G06T 7/194 345/419 |
| 2013/0039428 A1* | 2/2013 | Lakshman | H04N 19/523 375/240.16 |
| 2013/0063561 A1* | 3/2013 | Stephan | H04N 13/302 348/46 |
| 2013/0063571 A1* | 3/2013 | Ishii | G06T 5/003 348/47 |
| 2013/0070052 A1* | 3/2013 | Yamashita | H04N 13/178 348/43 |
| 2013/0070060 A1* | 3/2013 | Chatterjee | H04N 5/2258 348/47 |
| 2013/0076873 A1* | 3/2013 | Oshikiri | H04N 13/00 348/51 |
| 2013/0083173 A1* | 4/2013 | Geisner | G06F 3/1423 348/51 |
| 2013/0083220 A1* | 4/2013 | Imade | H04N 5/349 348/239 |
| 2013/0141475 A1* | 6/2013 | Kotani | G09G 5/001 345/690 |
| 2013/0307929 A1* | 11/2013 | Hattori | H04N 19/597 348/43 |
| 2013/0321396 A1* | 12/2013 | Kirk | G06T 15/205 345/419 |
| 2013/0321423 A1* | 12/2013 | Rossato | H04N 19/62 345/428 |
| 2014/0002612 A1* | 1/2014 | Morioka | G03B 35/08 348/46 |
| 2014/0003704 A1* | 1/2014 | Liao | G06T 7/13 382/154 |
| 2014/0049536 A1* | 2/2014 | Neuman | H04N 13/239 345/419 |
| 2014/0071245 A1* | 3/2014 | Zhang | H04N 13/239 348/47 |
| 2014/0078256 A1* | 3/2014 | Ogawa | H04N 13/106 348/43 |
| 2014/0152766 A1* | 6/2014 | Ogawa | H04N 21/4622 348/42 |
| 2014/0176751 A1* | 6/2014 | Kuzuya | G06T 5/003 348/222.1 |
| 2014/0267890 A1* | 9/2014 | Lelescu | H04N 9/045 348/373 |
| 2014/0340404 A1* | 11/2014 | Wang | G06T 15/20 345/427 |
| 2014/0369614 A1* | 12/2014 | Fenney | G06T 11/60 382/233 |
| 2015/0070350 A1* | 3/2015 | Cape | G02B 30/27 345/419 |
| 2015/0103197 A1* | 4/2015 | Djordjevic | G06T 15/205 348/218.1 |
| 2015/0170405 A1* | 6/2015 | Hu | G06T 15/205 345/427 |
| 2015/0195573 A1* | 7/2015 | Aflaki Beni | H04N 19/513 375/240.16 |
| 2015/0248744 A1* | 9/2015 | Hayasaka | G06T 3/4007 382/300 |
| 2015/0294189 A1* | 10/2015 | Benhimane | G06K 9/623 382/195 |
| 2015/0294492 A1* | 10/2015 | Koch | H04N 13/243 345/426 |
| 2015/0304531 A1* | 10/2015 | Rodriguez Garcia | G06T 19/006 345/419 |
| 2016/0088287 A1* | 3/2016 | Sadi | H04N 13/271 348/43 |
| 2016/0150210 A1* | 5/2016 | Chang | G06T 7/593 382/154 |
| 2016/0232710 A1* | 8/2016 | Herman | G06T 17/20 |
| 2016/0301919 A1* | 10/2016 | Weiblen | H04N 13/398 |
| 2016/0314613 A1* | 10/2016 | Nowozin | G06T 15/005 |
| 2016/0358383 A1* | 12/2016 | Gauglitz | G06T 19/006 |
| 2017/0039756 A1* | 2/2017 | Moule | H04N 5/74 |
| 2017/0099441 A1* | 4/2017 | Choi | H04N 5/77 |
| 2017/0142341 A1* | 5/2017 | Ikeda | G06K 9/00771 |
| 2017/0244948 A1* | 8/2017 | Pang | H04N 5/2226 |
| 2017/0278546 A1* | 9/2017 | Xiao | G11B 27/031 |
| 2017/0316602 A1* | 11/2017 | Smirnov | G06T 15/205 |
| 2017/0318283 A1* | 11/2017 | Watson | H04N 21/00 |
| 2017/0374269 A1* | 12/2017 | Govindarao | H04N 5/232127 |
| 2018/0014006 A1* | 1/2018 | Pothier | G06T 3/40 |
| 2018/0048810 A1* | 2/2018 | Matsushita | H04N 5/247 |
| 2018/0061086 A1* | 3/2018 | Yoshimura | H04N 5/23229 |
| 2018/0063514 A1* | 3/2018 | Mizuno | G06F 3/147 |
| 2018/0077210 A1* | 3/2018 | Hannuksela | H04N 21/23439 |
| 2018/0091798 A1* | 3/2018 | Chang | H04N 13/239 |
| 2018/0098047 A1* | 4/2018 | Itakura | H04N 13/279 |
| 2018/0124371 A1* | 5/2018 | Kamal | H04N 13/271 |
| 2018/0124382 A1* | 5/2018 | Smith | G06T 7/521 |
| 2018/0131921 A1* | 5/2018 | Haruyama | H04N 13/106 |
| 2018/0139364 A1* | 5/2018 | Jannard | H04N 5/2254 |
| 2018/0176557 A1* | 6/2018 | Ichigaya | H04N 19/105 |
| 2018/0184072 A1* | 6/2018 | Yoshimura | G06T 15/205 |
| 2018/0204381 A1* | 7/2018 | Kanatsu | H04N 5/23296 |
| 2018/0218485 A1* | 8/2018 | Xi | G06T 5/50 |
| 2018/0220125 A1* | 8/2018 | Tamir | H04N 13/257 |
| 2018/0246515 A1* | 8/2018 | Iwama | G05D 1/0274 |
| 2018/0268522 A1* | 9/2018 | Hawkins | G06T 7/50 |
| 2018/0288394 A1* | 10/2018 | Aizawa | H04N 5/2628 |
| 2018/0316902 A1* | 11/2018 | Tanaka | H04N 13/194 |
| 2018/0338123 A1* | 11/2018 | Moule | G06T 7/521 |
| 2018/0352207 A1* | 12/2018 | Kern, II | H04N 13/111 |
| 2018/0352215 A1* | 12/2018 | Iwakiri | H04N 13/296 |
| 2018/0352272 A1* | 12/2018 | Breitenfeld | G11B 27/036 |
| 2018/0359427 A1* | 12/2018 | Choi | H04N 21/44 |
| 2018/0376131 A1* | 12/2018 | Handa | H04N 17/002 |
| 2019/0028707 A1* | 1/2019 | Yu | G06T 7/74 |
| 2019/0045222 A1* | 2/2019 | Yip | H04N 19/162 |
| 2019/0068939 A1* | 2/2019 | Kang | H04N 19/132 |
| 2019/0068955 A1* | 2/2019 | Nakazato | H04N 13/275 |
| 2019/0075332 A1* | 3/2019 | Onuma | H04N 21/47217 |
| 2019/0098278 A1* | 3/2019 | Koizumi | H04N 13/282 |
| 2019/0102941 A1* | 4/2019 | Khan | H04N 13/366 |
| 2019/0104235 A1* | 4/2019 | Sarkar | H04N 21/23 |
| 2019/0124316 A1* | 4/2019 | Yoshimura | H04N 13/324 |
| 2019/0132529 A1* | 5/2019 | Ito | H04N 13/189 |
| 2019/0158809 A1* | 5/2019 | Sasaki | H04N 13/117 |
| 2019/0158815 A1* | 5/2019 | He | H04N 19/39 |
| 2019/0174122 A1* | 6/2019 | Besley | G06T 7/85 |
| 2019/0180514 A1* | 6/2019 | Sasaki | H04N 13/363 |
| 2019/0182469 A1* | 6/2019 | Sakakima | H04N 5/265 |
| 2019/0182470 A1* | 6/2019 | Mizuno | G06T 1/0007 |
| 2019/0188871 A1* | 6/2019 | Fletcher | H04N 13/15 |
| 2019/0197715 A1* | 6/2019 | Rebecq | G06T 15/20 |
| 2019/0220002 A1* | 7/2019 | Huang | G06T 7/593 |
| 2019/0228563 A1* | 7/2019 | Maeda | G06T 19/20 |
| 2019/0228565 A1* | 7/2019 | Yushiya | G06T 19/00 |
| 2019/0238861 A1* | 8/2019 | D'Acunto | H04N 21/21805 |
| 2019/0259136 A1* | 8/2019 | Shpalensky | G06N 3/0454 |
| 2019/0281274 A1* | 9/2019 | Sugio | H04N 13/111 |
| 2019/0289275 A1* | 9/2019 | Arai | H04N 5/247 |
| 2019/0304076 A1* | 10/2019 | Nina Paravecino | G06K 9/00342 |
| 2019/0311199 A1* | 10/2019 | Mukherjee | G06T 7/75 |
| 2019/0311471 A1* | 10/2019 | Kurabayashi | G06F 3/01 |
| 2019/0311526 A1* | 10/2019 | Sugio | H04N 13/279 |
| 2019/0342537 A1* | 11/2019 | Taya | G06T 15/20 |
| 2019/0349560 A1* | 11/2019 | Yoshimura | G06K 9/00664 |
| 2019/0364263 A1* | 11/2019 | Jannard | H04N 13/243 |
| 2019/0370926 A1* | 12/2019 | Hagland | G06F 3/012 |
| 2020/0020075 A1* | 1/2020 | Khwaja | G06T 3/4038 |
| 2020/0036955 A1* | 1/2020 | Pesonen | H04N 13/282 |
| 2020/0053336 A1* | 2/2020 | Kawai | H04N 5/247 |
| 2020/0084431 A1* | 3/2020 | Kato | G09G 5/00 |
| 2020/0098164 A1* | 3/2020 | Bruns | G06T 15/04 |
| 2020/0111233 A1* | 4/2020 | Thyagharajan | G06T 7/50 |
| 2020/0112710 A1* | 4/2020 | Oh | H04N 13/194 |
| 2020/0118342 A1* | 4/2020 | Varshney | H04S 7/304 |
| 2020/0126290 A1* | 4/2020 | Itakura | G06T 15/20 |
| 2020/0128230 A1* | 4/2020 | Shikata | H04N 21/21805 |
| 2020/0132451 A1* | 4/2020 | Wei | G01B 11/2504 |
| 2020/0145635 A1* | 5/2020 | Yoneda | H04N 21/42204 |

(56) References Cited

U.S. PATENT DOCUMENTS

| | | | |
|---|---|---|---|
| 2020/0167933 A1* | 5/2020 | Matsushita | G06T 7/194 |
| 2020/0169713 A1* | 5/2020 | Umemura | G01B 11/00 |
| 2020/0209392 A1* | 7/2020 | Sadhu | G01S 17/10 |
| 2020/0213487 A1* | 7/2020 | Nakata | H04N 5/232122 |
| 2020/0213610 A1* | 7/2020 | Kondo | H04N 19/51 |
| 2020/0302571 A1* | 9/2020 | Schwarz | H04N 19/597 |
| 2020/0310128 A1* | 10/2020 | Otsuka | G02B 27/0172 |
| 2020/0382757 A1* | 12/2020 | Oh | H04N 21/235 |

OTHER PUBLICATIONS

International Search Report (ISR) dated Mar. 13, 2018 in International (PCT) Application No. PCT/JP2018/004223.
Koichi Hamada, et al., "Performance Evaluation and Quality Improvement of Super-Resolved Free-Viewpoint Image Synthesis", IEICE Technical Report, IE2012-85, vol. 36, No. 48, Nov. 2012, pp. 17-22 with English translation.

* cited by examiner

⌦ : FIXED CAMERA

▷□ : FREE VIEWPOINT CAMERA (VIRTUAL CAMERA)

FREE-VIEWPOINT VIDEO GENERATING METHOD AND FREE-VIEWPOINT VIDEO GENERATING SYSTEM

CROSS REFERENCE TO RELATED APPLICATIONS

This application is a U.S. continuation application of PCT International Patent Application Number PCT/JP2018/004223 filed on Feb. 7, 2018, claiming the benefit of priority of U.S. Provisional Patent Application No. 62/457,276 filed on Feb. 10, 2017, the entire contents of which are hereby incorporated by reference.

BACKGROUND

1. Technical Field

The present disclosure relates to a free-viewpoint video generating method and a free-viewpoint video generating system.

2. Description of the Related Art

International Publication No. WO 2014/077024 discloses an image processing technology that generates a single high resolution image from a group of multi-viewpoint input images with low resolution.

SUMMARY

A free-viewpoint video generating method according to an aspect of the present disclosure includes: obtaining a multi-viewpoint video including N videos of N viewpoints, N being an integer greater than 1; and generating a free-viewpoint video of a virtual viewpoint based on the multi-viewpoint video such that the free-viewpoint video shows target areas and has a first resolution higher than each of resolutions of the N videos, the virtual viewpoint being different from the N viewpoints. For each target area, the generating includes: referring to a three-dimensional model generated based on the N videos to specify N reference areas which are shown by the N videos and which correspond to the each target area in the free-viewpoint video; and calculating components of pixels to represent the each target area in the free-viewpoint video, based on components of pixels to represent the N reference areas in the N videos.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1:
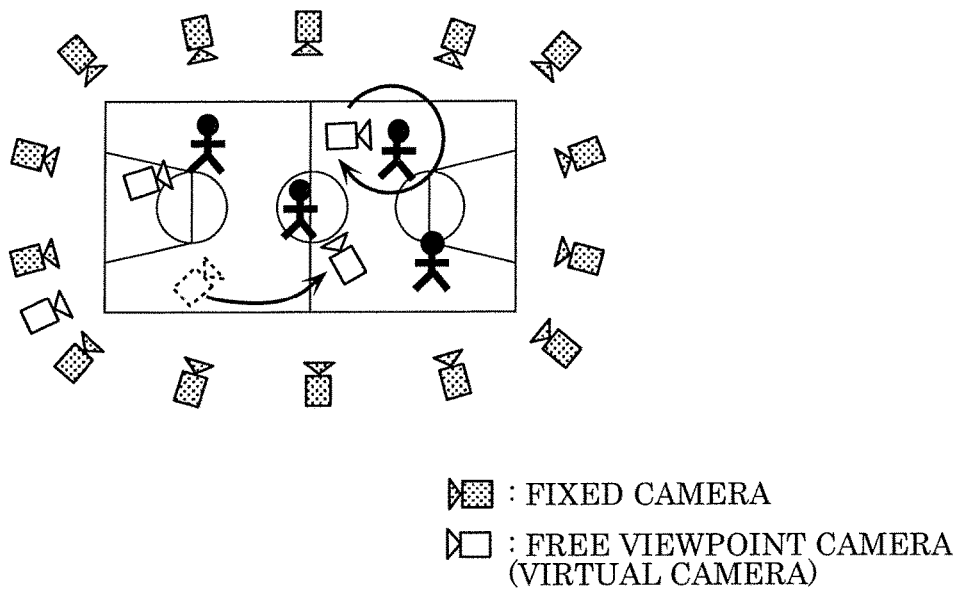
FIG. 1 is a diagram showing the outline of a free-viewpoint video generating system according to an embodiment.

DETAILED DESCRIPTION OF THE EMBODIMENTS (Underlying Knowledge Forming Basis of One Aspect of Present Disclosure)

International Publication No. WO 2014/077024 discloses an image processing technology that generates a single high resolution image from a group of multi-viewpoint input images with low resolution. Such processing is also called super-resolution processing. For example, a high resolution image is generated by estimating the pixel component of a processing target area of a generation target image with a resolution higher than the resolution of a plurality of input images, from a plurality of pixel components of a plurality of areas corresponding to the processing target area of the generation target image in a plurality of input images.

However, it is not easy to appropriately specify a plurality of areas corresponding to the processing target area of the generation target image in a plurality of input images of various viewpoints. Accordingly, it is not easy to appropriately generate free-viewpoint video with high resolution from a plurality of videos of various viewpoints.

In view of this, a free-viewpoint video generating method according to an aspect of the present disclosure includes: obtaining a multi-viewpoint video including N videos of N viewpoints, where N is an integer equal to or greater than 2; and generating a free-viewpoint video from the obtained multi-viewpoint video, the free-viewpoint video being a video of a virtual viewpoint different from the N viewpoints. In the generating: N reference areas corresponding to a processing target area in the free-viewpoint video are specified in the N videos by using a three-dimensional model generated from the N videos; a pixel component of the processing target area in the free-viewpoint video is estimated with a predetermined resolution higher than respective resolutions of the N reference areas, from N pixel components of the N reference areas in the N videos; and a video constructed by the estimated pixel component is generated as the free-viewpoint video.

In this manner, a plurality of reference areas corresponding to the processing target area can be appropriately specified by using a three-dimensional model. Then, the pixel component of a processing target area can be appropriately estimated with high resolution from a plurality of pixel components of the plurality of reference areas. Accordingly, it becomes possible to appropriately generate a free-viewpoint video with high resolution from a plurality of videos of various viewpoints.

For example, in the generating, a three-dimensional area corresponding to the processing target area may be specified in the three-dimensional model, and the N reference areas corresponding to the three-dimensional area may be specified in the N videos.

In this manner, in the three-dimensional model, a three-dimensional area corresponding to the processing target area can be appropriately specified. Then, in a plurality of videos included in the multi-viewpoint video, a plurality of reference areas corresponding to the three-dimensional area can be appropriately specified.

Furthermore, for example, in the generating, the N videos may be upsampled to a sub-pixel accuracy, the N reference areas corresponding to the processing target area may be specified with the sub-pixel accuracy in the upsampled N videos, and the pixel component of the processing target area may be estimated from the N pixel components of the N reference areas in the upsampled N videos.

In this manner, a plurality of reference areas corresponding to the processing target area can be appropriately specified with sub-pixel accuracy. Then, the pixel component of a processing target area can be appropriately estimated with high resolution from a plurality of pixel components of a plurality of reference areas in a plurality of videos that are upsampled to the sub-pixel accuracy.

Furthermore, for example, the N videos may be N videos of N viewpoints of N cameras, the free-viewpoint video may be a video of a virtual viewpoint of a virtual camera, and in the generating: N camera parameters of the N cameras may be estimated from the N videos; the three-dimensional model may be generated from the N videos by using the N camera parameters; and the N reference areas corresponding to the processing target area may be specified by using the three-dimensional model, the N camera parameters, and a camera parameter of the virtual camera.

In this manner, a plurality of reference areas corresponding to the processing target area can be appropriately specified by using the three-dimensional model, a plurality of camera parameters, etc.

Furthermore, for example, in the generating: the N videos included in the obtained multi-viewpoint video may be parallelized by converting the N videos included in the obtained multi-viewpoint video into N videos with parallel view field directions; the N reference areas corresponding to the processing target area may be specified in the N parallelized videos; and the pixel component of the processing target area may be estimated from the N pixel components of the N reference areas in the N parallelized videos.

In this manner, it becomes possible to align the forms of a plurality of pixel components of a plurality of reference areas. Accordingly, it becomes possible to efficiently estimate the pixel component of a processing target area from a plurality of pixel components of a plurality of reference areas.

Furthermore, for example, in the generating, the N videos included in the obtained multi-viewpoint video may be parallelized by converting the N videos included in the obtained multi-viewpoint video into N videos with parallel view field directions with respect to a view field direction of the virtual viewpoint.

In this manner, it becomes possible to align the form of a plurality of pixel components of a plurality of reference areas with the form near the form of the pixel component of a processing target area. Accordingly, it becomes possible to efficiently estimate the pixel component of a processing target area from a plurality of pixel components of a plurality of reference areas.

Furthermore, for example, in the generating: a reference view field direction for parallelizing the N videos included in the obtained multi-viewpoint video may be determined so that a generation amount of an aliasing component in the N parallelized videos is included in a predetermined range; and the N videos may be parallelized by converting the N videos included in the obtained multi-viewpoint video into N videos with parallel view field directions with respect to the reference view field direction.

In this manner, the reference view field direction for parallelization can be determined according to the generation amount of the aliasing component. Accordingly, a plurality of videos can be parallelized so that the pixel component of a processing target area can be appropriately estimated with high resolution.

Furthermore, for example, in the generating: when a generation amount of an aliasing component in the N reference areas in the N parallelized videos is larger than a threshold value, the pixel component of the processing target area may be estimated with the predetermined resolution; and when the generation amount of the aliasing component in the N reference areas is not larger than the threshold value, the pixel component of the processing target area may be estimated with a resolution lower than the predetermined resolution.

In this manner, when it is possible to appropriately estimate the pixel component of a processing target area with high resolution, the pixel component of a processing target area is estimated with high resolution. Accordingly, estimation can be efficiently performed.

Furthermore, for example, the obtained multi-viewpoint video may include M videos including the N videos, where M is an integer greater than N, the M videos may be videos of M viewpoints of M cameras, the free-viewpoint video may be a video of a virtual viewpoint of a virtual camera, and in the generating, the N videos may be selected from the M videos by using M camera parameters of the M cameras, and a camera parameter of the virtual camera.

In this manner, among a plurality of videos included in a multi-viewpoint video, a video appropriate for the processing of generating a free-viewpoint video with high resolution can be used. Accordingly, a free-viewpoint video can be appropriately generated.

Furthermore, for example, in the generating, the pixel component of the processing target area may be estimated from the N pixel components of the N reference areas by using the maximum a posteriori (MAP) method, the iterative back projection (IBP) method, or the projection onto convex set (POCS) method.

In this manner, the pixel component of a processing target area can be appropriately estimated with high resolution from a plurality of pixel components of a plurality of reference areas.

Furthermore, a free-viewpoint video generating method according to an aspect of the present disclosure may include: obtaining a multi-viewpoint video including N videos of N viewpoints, where N is an integer equal to or greater than 2; and generating a free-viewpoint video from the obtained multi-viewpoint video, the free-viewpoint video being a video of a virtual viewpoint different from the N viewpoints. In the generating: the N videos included in the obtained multi-viewpoint video may be parallelized by converting the N videos included in the obtained multi-viewpoint video into N videos with parallel view field directions; N reference areas that fit to each other in the N parallelized videos may be specified by performing block matching on the N parallelized videos; a pixel component of a processing target area corresponding to the N reference areas may be estimated in the free-viewpoint video with a predetermined resolution higher than respective resolutions of the N reference areas, from N pixel components of the N reference areas; and the free-viewpoint video constructed by the estimated pixel component may be generated.

In this manner, block matching can be appropriately performed in a plurality of parallelized videos. Accordingly, a plurality of reference areas in a plurality of videos can be appropriately specified. Then, the pixel component of a processing target area can be appropriately estimated with high resolution from a plurality of pixel components of a plurality of reference areas. Accordingly, it becomes possible to appropriately generate a free-viewpoint video with high resolution from a plurality of videos of various viewpoints.

Furthermore, a free-viewpoint video generating system according to an aspect of the present embodiment may include: an obtainer configured to obtain a multi-viewpoint video including N videos of N viewpoints, where N is an integer equal to or greater than 2; and a generator configured to generate a free-viewpoint video from the obtained multi-viewpoint video, the free-viewpoint video being a video of a virtual viewpoint different from the N viewpoints. The generator may be configured to: specify, in the N videos, N reference areas corresponding to a processing target area in the free-viewpoint video by using a three-dimensional model generated from the N videos; estimate, from N pixel components of the N reference areas in the N videos, a pixel component of the processing target area in the free-viewpoint video, with a predetermined resolution higher than respective resolutions of the N reference areas; and generate, as the free-viewpoint video, a video constructed by the estimated pixel component.

In this manner, the free-viewpoint video generating system can appropriately specify a plurality of reference areas corresponding to a processing target area by using the three-dimensional model. Then, the free-viewpoint video generating system can appropriately estimate the pixel component of a processing target area with high resolution from a plurality of pixel components of a plurality of reference areas. Accordingly, the free-viewpoint video generating system can appropriately generate a free-viewpoint video with high resolution from a plurality of videos of various viewpoints.

Furthermore, a free-viewpoint video generating system according to an aspect of the present embodiment may include: an obtainer configured to obtain a multi-viewpoint video including N videos of N viewpoints, where N is an integer equal to or greater than 2; and a generator configured to generate a free-viewpoint video from the obtained multi-viewpoint video, the free-viewpoint video being a video of a virtual viewpoint different from the N viewpoints. The generator may be configured to: parallelize the N videos included in the obtained multi-viewpoint video by converting the N videos included in the obtained multi-viewpoint video into N videos with parallel view field directions; specify N reference areas that fit to each other in the N parallelized videos by performing block matching on the N parallelized videos; estimate, from N pixel components of the N reference areas, a pixel component of a processing target area corresponding to the N reference areas in the free-viewpoint video, with a predetermined resolution higher than respective resolutions of the N reference areas; and generate the free-viewpoint video constructed by the estimated pixel component.

In this manner, the free-viewpoint video generating system can appropriately perform block matching in a plurality of parallelized videos. Therefore, the free-viewpoint video generating system can appropriately specify a plurality of reference areas in a plurality of videos. Then, the free-viewpoint video generating system can appropriately estimate the pixel component of a processing target area with high resolution from a plurality of pixel components of a plurality of reference areas. Accordingly, the free-viewpoint video generating system can appropriately generate a free-viewpoint video with high resolution from a plurality of videos of various viewpoints.

In addition, these generic or specific aspects may be implemented as a system, an apparatus, a method, an integrated circuit, a computer program, or a computer-readable recording medium such as a CD-ROM, or may be implemented as any combination of a system, an apparatus, a method, an integrated circuit, a computer program, and a recording medium.

Hereinafter, embodiments will be described in detail with reference to the drawings. Note that each of the embodiments described below shows a generic or a specific example. The numerical values, shapes, materials, structural components, the arrangement and connection of the structural components, steps, the processing order of the steps, etc. shown in the following embodiments are mere examples, and thus are not intended to limit the scope of the claims. Furthermore, among the structural components described in the following embodiments, structural components not recited in any one of the independent claims that indicate the broadest concepts are described as optional structural components.

EMBODIMENTS

In the three-dimensional reconstruction technology in the field of computer vision, in order to reconstruct a three-dimensional image, matching is performed among a plurality of two-dimensional images of a multi-viewpoint video, and the position and orientation of a camera, and the three-dimensional position of a subject are estimated. For example, a three-dimensional point group constituted by three-dimensional points indicating the three-dimensional position of the subject is estimated as a three-dimensional model by three-dimensional reconstruction processing.

Additionally, in the free-viewpoint video generation technology, a video of a virtual viewpoint (i.e., a video from a camera virtually installed at an arbitrary position) can be generated by performing rendering by using the three-dimensional model estimated by the three-dimensional reconstruction processing. Hereinafter, the camera virtually installed at an arbitrary position is also represented as a virtual camera. Additionally, a camera that actually photographs a scene is also represented as a real camera.

In addition, obtaining an image or a video by photographing a subject or a scene, etc. may be represented as photographing an image or a video. Additionally, an image obtained by photographing a subject or a scene, etc. may be represented as a photographed image. Furthermore, a video obtained by photographing a subject or a scene, etc. may be represented as a photographed video.

In addition, a video virtually photographed with a virtual camera is also represented as a virtual viewpoint video, an arbitrary viewpoint video, a free-viewpoint video, or a virtual camera video. An image virtually photographed with a virtual camera is also represented as a virtual viewpoint image, an arbitrary viewpoint image, a free-viewpoint image, or a virtual camera image. A video photographed with a real camera is also represented as a real viewpoint video or a real camera video. An image photographed with a real camera is also represented as a real viewpoint image or a real camera image.

FIG. 1 is a diagram showing the outline of a free-viewpoint video generating system. For example, with a multi-viewpoint video obtained by photographing the same space from many viewpoints by using a calibrated camera (for example, a fixed camera), three-dimensional reconstruction of the space (three-dimensional-space reconstruction) is performed. Then, by performing tracking, scene analysis, and a video rendering by using the data obtained by this three-dimensional reconstruction, a video seen from an arbitrary viewpoint (a free-viewpoint camera) is generated as a free-viewpoint video. In this manner, a free-viewpoint video generating system is realized.

A plurality of videos and a plurality of images obtained by photographing a subject existing in a real space with a plurality of real cameras from a plurality of mutually different viewpoints are called a multi-viewpoint video and a multi-viewpoint image. That is, a multi-viewpoint image includes a plurality of two-dimensional images obtained by photographing the same subject from a plurality of mutually different viewpoints. Additionally, a series of multi-viewpoint images obtained by photographing the subject in chronological order are called a multi-viewpoint video. It is called three-dimensional reconstruction to reconstruct a subject in a three dimensional space by using a multi-viewpoint image or a multi-viewpoint video.

Figure 2:
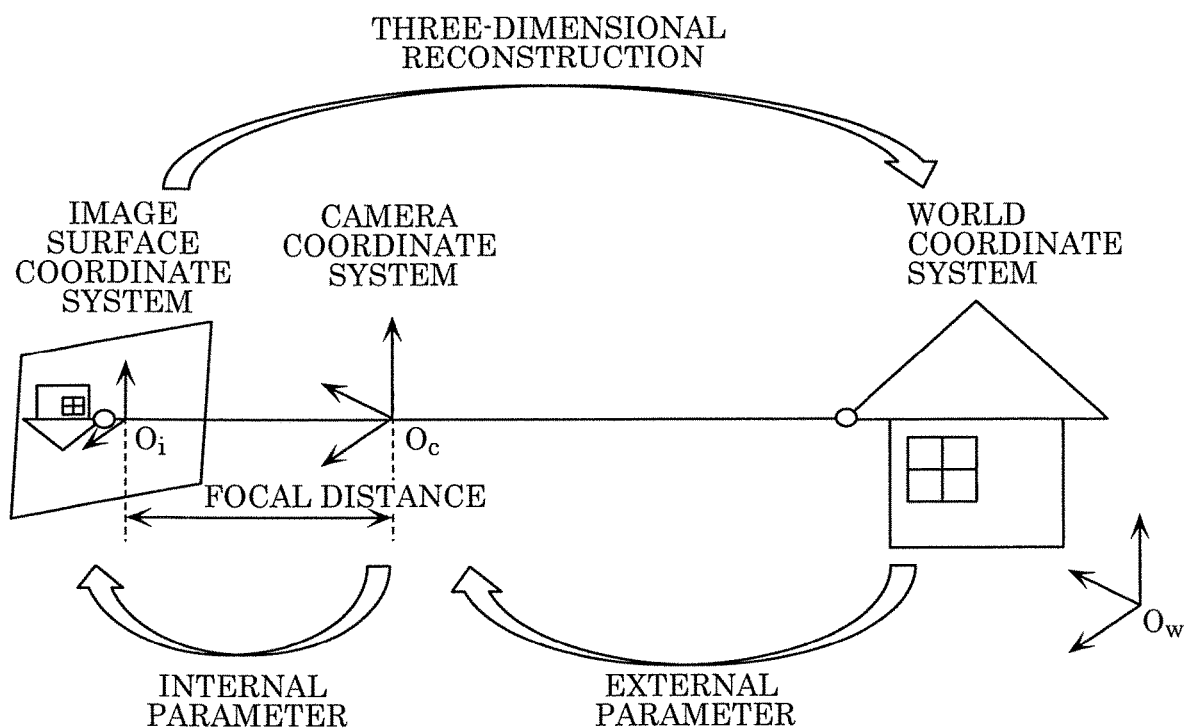
FIG. 2 is a diagram for describing a three-dimensional reconstruction processing according to an embodiment.

FIG. 2 is a diagram showing the mechanism of the three-dimensional reconstruction. The free-viewpoint video generating system reconstructs a subject in a three dimensional space by reconstructing points in a world coordinate system from points in an image surface coordinate system by using camera parameters.

The subject reconstructed in the three dimensional space is called a three-dimensional model. The three-dimensional model of the subject is constructed by three-dimensional points indicating the three-dimensional positions corresponding to a plurality of points on the subject, respectively, which are reflected in the two-dimensional images constituting a multi-viewpoint image. The three-dimensional position is represented by three-value information including an X component, a Y component, and a Z component of a three-dimensional coordinate space constituted by an X axis, a Y axis, and a Z-axis, for example.

Note that the three-dimensional model may include not only the three-dimensional position but also information indicating the color of each point, and may include information indicating each point and the shape of a surface surrounding the point.

Additionally, the free-viewpoint video generating system may obtain camera parameters of each camera in advance, and may estimate the camera parameters of each camera simultaneously with the reconstruction of the three-dimensional model. It is called calibration to estimate the camera parameters. The camera parameters include an internal parameter indicating a focal distance, an image center, etc. of a camera, and an external parameter indicating the three-dimensional position and orientation of a camera.

Additionally, FIG. 2 shows an example of a typical pinhole-camera model. The lens distortion of a camera is not considered in this model. When the lens distortion is considered, the free-viewpoint video generating system uses a compensation position obtained by normalizing the position of a point in the image surface coordinate system with a distortion model.

Figure 3A:
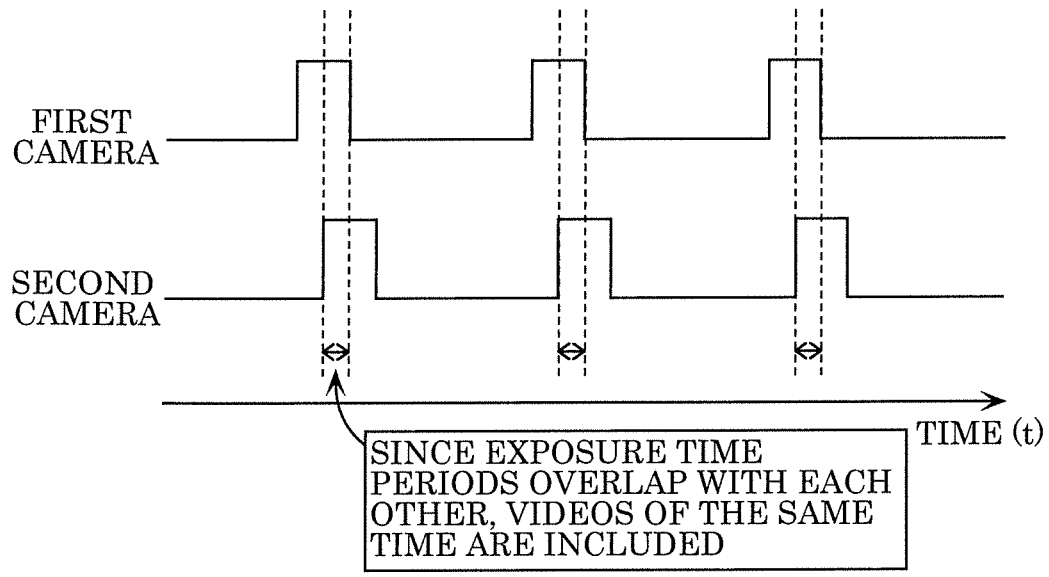
FIG. 3A is a diagram for describing synchronous photography according to an embodiment.
Figure 3B:
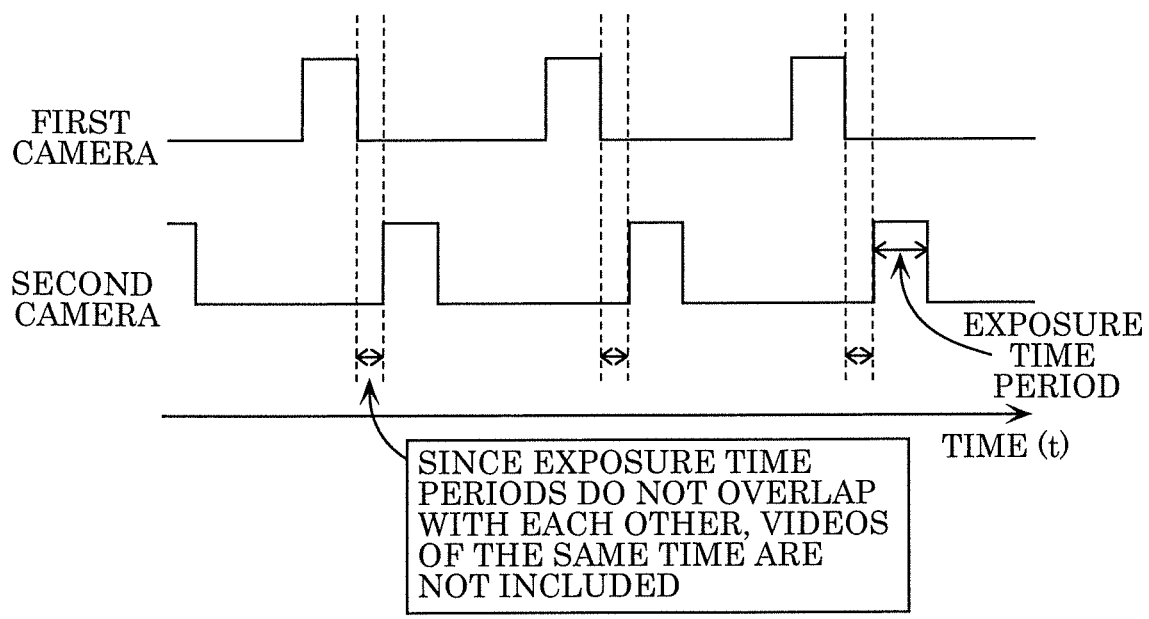
FIG. 3B is a diagram for describing asynchronous photography according to an embodiment.

FIG. 3A and FIG. 3B are diagrams for describing synchronous photography of a multi-viewpoint video in the present disclosure, and show examples of the photography cycle and exposure time period of a camera. In FIG. 3A and FIG. 3B, a horizontal direction represents the time, and the time period in which a rectangle signal rises (i.e., the time period in which a line is positioned on the upper side) represents the time period in which the camera is exposing. The time period in which a shutter is opened for obtaining an image with the camera is called the exposure time period.

A scene exposed to an image sensor through a lens during the exposure time period is obtained as an image. In FIG. 3A, when images are obtained with two cameras of different viewpoints, the exposure time periods overlap with each other. Therefore, the images obtained with the two cameras are synchronous images including scenes of the same time. On the other hand, in FIG. 3B, since the exposure time periods do not overlap with each other, the images obtained with the two cameras are asynchronous images not including scenes of the same time. It is called synchronous photography to photograph synchronous images with a plurality of cameras as shown in FIG. 3A.

Figure 4:
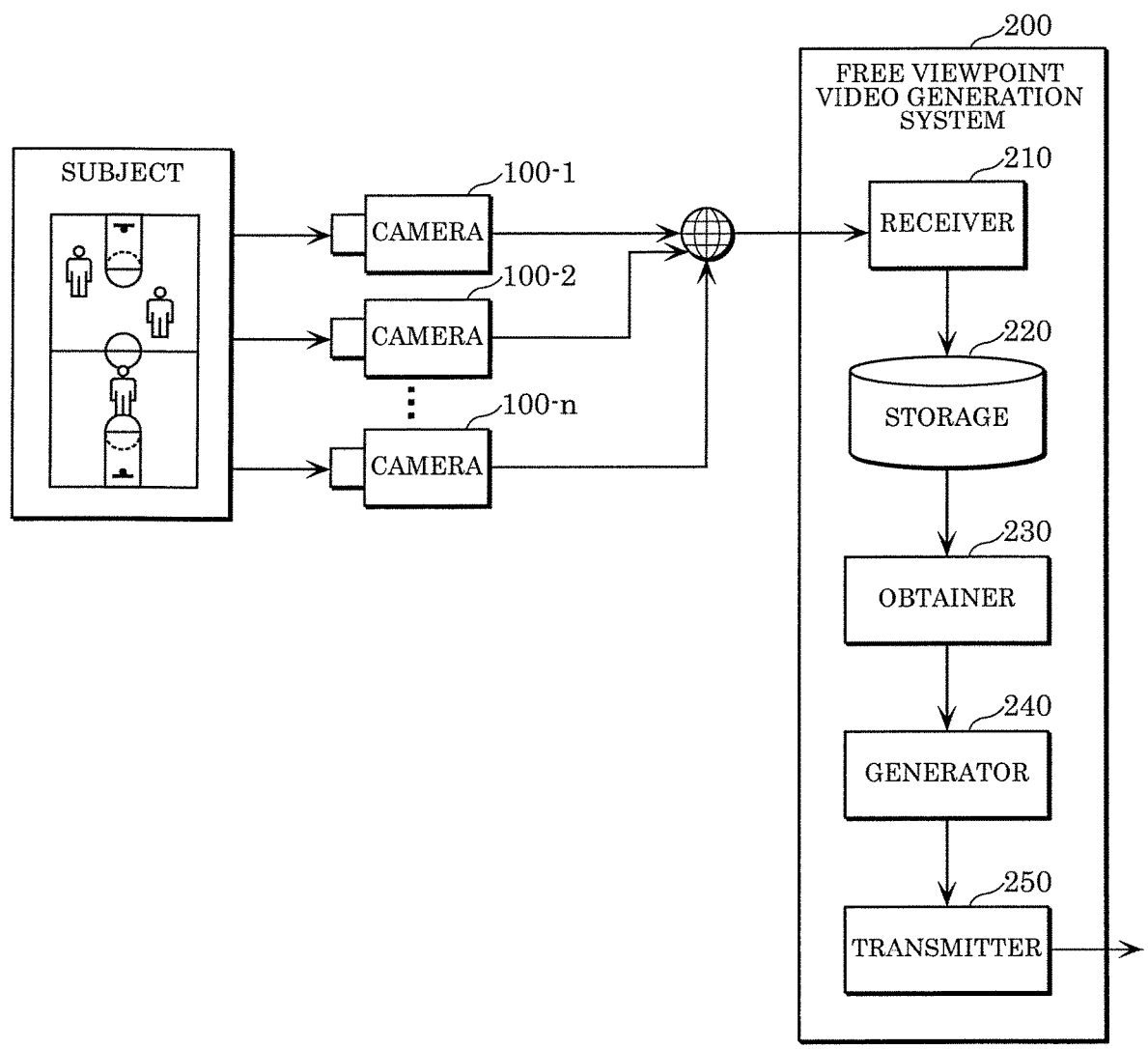
FIG. 4 is a block diagram showing the configuration of an entire system including a free-viewpoint video generating system according to an embodiment.

FIG. 4 is a block diagram showing the configuration of an entire system including the free-viewpoint video generating system according to this embodiment. The entire system shown in FIG. 4 includes a plurality of cameras 100-1, 100-2, ..., 100-n, and free-viewpoint video generating system 200. Free-viewpoint video generating system 200 includes receiver 210, storage 220, obtainer 230, generator 240, and transmitter 250.

The plurality of cameras 100-1 to 100-n photograph a subject, and output a multi-viewpoint video constituted by a plurality of photographed videos of the subject. Therefore, the multi-viewpoint video includes a plurality of real viewpoint videos. Additionally, each real viewpoint video includes a plurality of real viewpoint images.

Transmission of the multi-viewpoint video may be performed via a public telecommunication network, such as the Internet, or may be performed via a private communication network. Alternatively, the multi-viewpoint video may be stored in an external storage device, such as a hard disk drive (HDD) or a solid state drive (SSD), and may be input to free-viewpoint video generating system 200 when necessary. Alternatively, the multi-viewpoint video may be transmitted to and once stored in an external storage device such as a cloud server via a network, and may be transmitted to free-viewpoint video generating system 200 when necessary.

Additionally, each of the plurality of cameras 100-1 to 100-n may be a fixed camera such as a surveillance camera, may be a mobile camera such as a video camera, a smart phone, or a wearable camera, or may be a moving camera such as a drone with a photography function. In addition, camera specification information, such as a camera ID, for specifying the camera that photographed the video or the image may be added to the multi-viewpoint video as header information of the video or the image.

Synchronous photography of photographing the subject at the same time for every photography cycle may be performed by using the plurality of cameras 100-1 to 100-n. Alternatively, synchronous photography may not be performed, and photography time information may be added to each video or image by adjusting the time of clocks incorporated in the plurality of cameras 100-1 to 100-n, or an index number indicating the photography order may be added. Additionally, information indicating the synchronous photography or the asynchronous photography may be added as header information to a video set of multi-viewpoint videos, each video, or each image.

A free-viewpoint video output from transmitter 250 may be displayed on a display directly connected to free-viewpoint video generating system 200, or may be displayed on a terminal connected to free-viewpoint video generating system 200 via a network. Alternatively, the free-viewpoint video output from transmitter 250 may be displayed on a display included in free-viewpoint video generating system 200.

Figure 5:
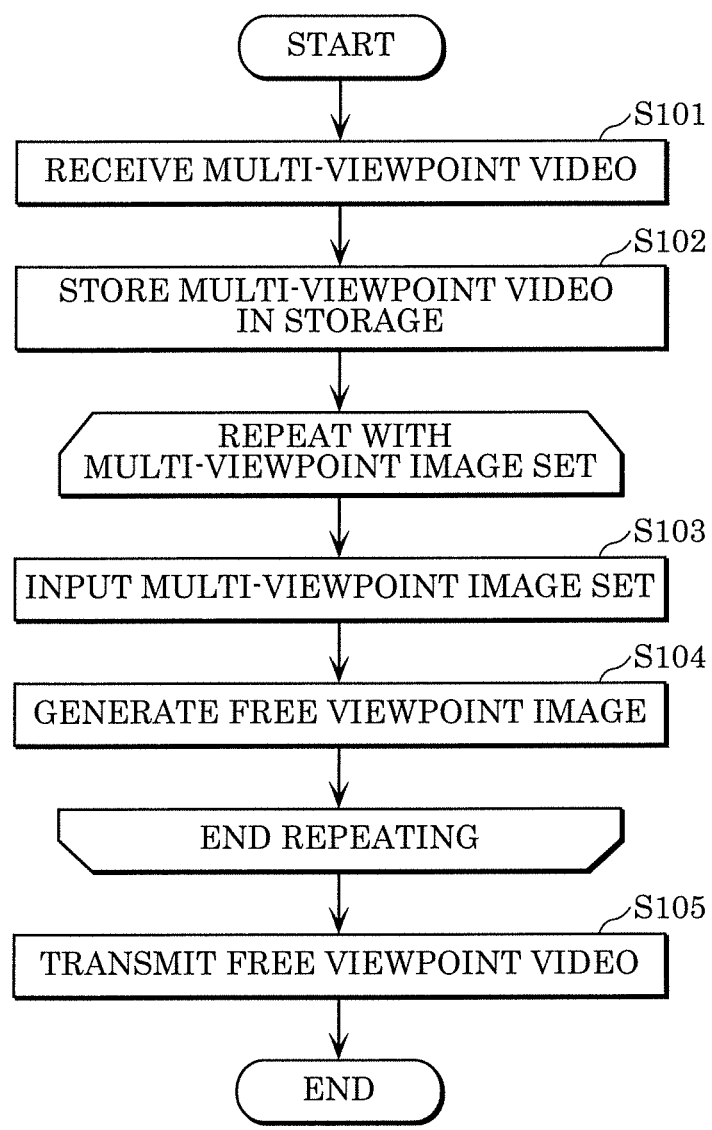
FIG. 5 is a flowchart showing the operation of a free-viewpoint video generating system according to an embodiment.

FIG. 5 is a flowchart showing the operation of free-viewpoint video generating system 200 shown in FIG. 4. First, receiver 210 receives a multi-viewpoint video obtained by the plurality of cameras 100-1 to 100-n (S101). Then, receiver 210 stores the received multi-viewpoint video in storage 220 (S102). Next, obtainer 230 selects one or more real viewpoint images from the multi-viewpoint video, and inputs the one or more selected real viewpoint images to generator 240 as a multi-viewpoint image set (S103).

For example, the multi-viewpoint image set may be constructed by a plurality of real viewpoint images that are obtained by selecting one real viewpoint image from each of all the real viewpoint videos. Additionally, for example, the multi-viewpoint image set may be constructed by a plurality of real viewpoint images obtained by selecting at least one real viewpoint image from each of all the real viewpoint videos.

Additionally, for example, the multi-viewpoint image set may be constructed by a plurality of real viewpoint images obtained by selecting two or more real viewpoint videos of the multi-viewpoint video, and selecting one real viewpoint image from each of the selected real viewpoint videos. In addition, the multi-viewpoint image set may be constructed by a plurality of real viewpoint images obtained by selecting two or more real viewpoint videos of the multi-viewpoint video, and selecting at least one real viewpoint image from each of the selected real viewpoint videos.

When the camera specification information is not added to each real viewpoint image of the multi-viewpoint image set, obtainer 230 may individually add the camera specification information to the header information of each real viewpoint image, or may collectively add the camera specification information to the header information of the multi-viewpoint image set.

Additionally, when the photography time or the index number indicating the order of photography is not added to each real viewpoint image of the multi-viewpoint image set, obtainer 230 may individually add the photography time or the index number to the header information of each real viewpoint image. Alternatively, in this case, obtainer 230 may collectively add the photography time or the index number to the header information of the multi-viewpoint image set.

Next, using the multi-viewpoint image set, generator 240 estimates the camera parameters of each camera, and reconstructs the three-dimensional model of the subject reflected in each real viewpoint image. Then, generator 240 generates a virtual viewpoint image constructing the video of a virtual camera as a free-viewpoint image by performing rendering by using the multi-viewpoint image set, the camera parameters, and the three-dimensional model (S104).

The processing in steps S103 and S104 is repeatedly performed for each multi-viewpoint image set. Finally, transmitter 250 transmits a free-viewpoint video constructed by the free-viewpoint images to the outside (S105).

The camera parameters and the three-dimensional model used for rendering in generator 240 may be estimated by calibration in generator 240, etc., or may be provided from the outside. When the camera parameters and the three-dimensional model are provided from the outside, in addition to the multi-viewpoint video, the camera parameters and the three-dimensional model are also processed in receiver 210, storage 220, and obtainer 230.

Note that the camera parameters may be provided from the outside, and the three-dimensional model may be estimated by generator 240. In this embodiment, basically, generator 240 estimates both the camera parameters and the three-dimensional model.

Figure 6:
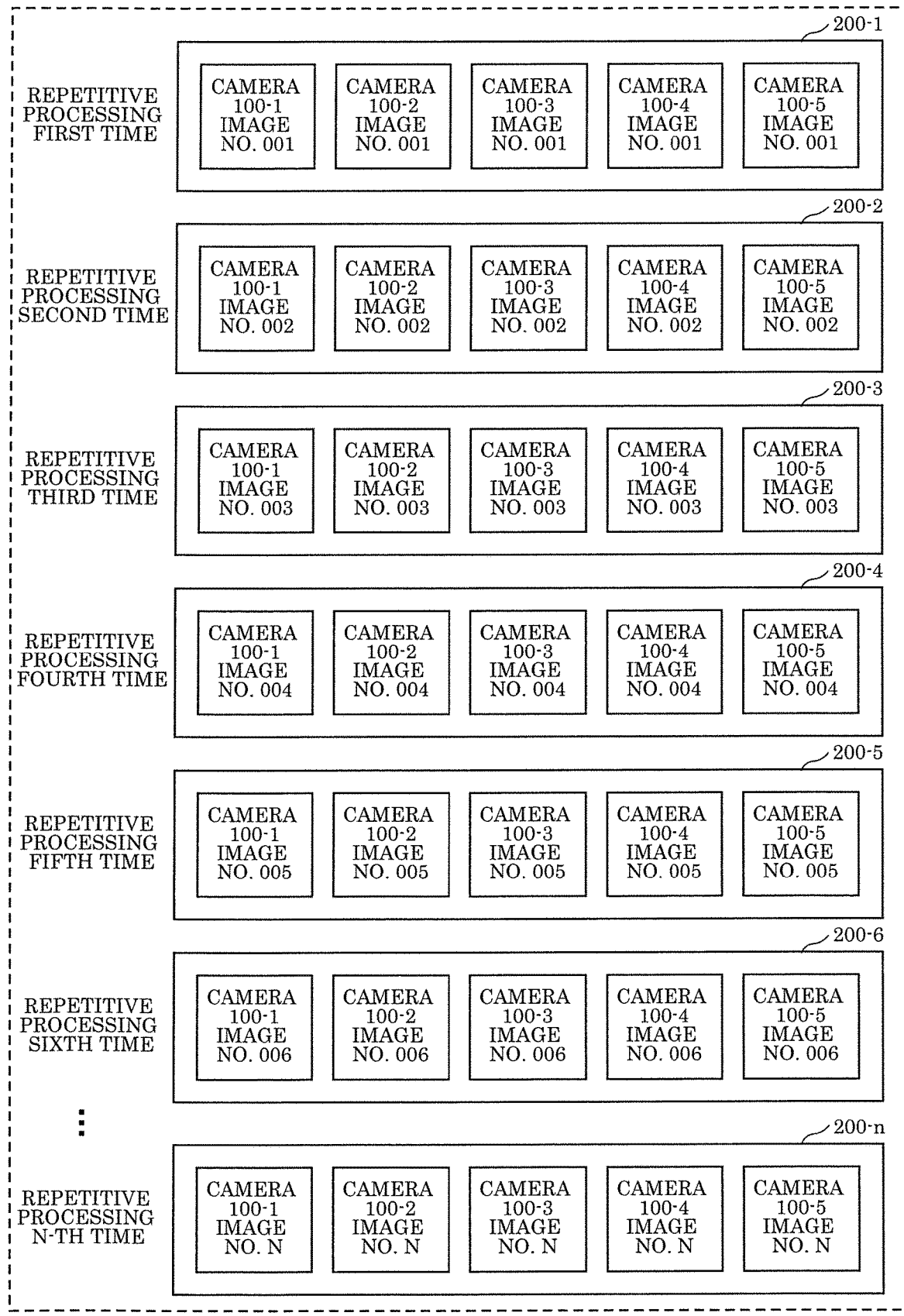
FIG. 6 is a diagram showing an example of a multi-view image set according to an embodiment.

FIG. 6 is a diagram showing an example of the multi-viewpoint image set. Obtainer 230 may determine the multi-viewpoint image set including five real viewpoint images by selecting one real viewpoint image from each of the five cameras 100-1 to 100-5.

First, the five cameras 100-1 to 100-5 perform synchronous photography. Camera IDs, which specify the cameras that photographed the real viewpoint images, are given to the header information of each real viewpoint image as 100-1 to 100-5, respectively. Additionally, image numbers 001 to N, which indicate the photography order in each camera, are given to the header information of each real viewpoint image. The real viewpoint images having the same image number between the cameras indicate that the subject of the same time is photographed.

Obtainer 230 sequentially inputs multi-viewpoint image sets 200-1 to 200-n to generator 240 by sequentially outputting multi-viewpoint image sets 200-1 to 200-n. Generator 240 sequentially performs three-dimensional reconstruction by repetitive processing using multi-viewpoint image sets 200-1 to 200-*n*.

Multi-viewpoint image set 200-1 is constructed by five real viewpoint images having an image number 001 of camera 100-1, the image number 001 of camera 100-2, the image number 001 of camera 100-3, the image number 001 of camera 100-4, and the image number 001 of camera 100-5. Generator 240 reconstructs the three-dimensional model at the photography time of the image number 001 by using this multi-viewpoint image set 200-1 in the first time of the repetitive processing as a first image collection of a multi-viewpoint video.

In multi-viewpoint image set 200-2, the image number is updated in all of cameras 100-1 to 100-5.

That is, multi-viewpoint image set 200-2 is constructed by five real viewpoint images having an image number 002 of camera 100-1, the image number 002 of camera 100-2, the image number 002 of camera 100-3, the image number 002 of camera 100-4, and the image number 002 of camera 100-5. Generator 240 reconstructs the three-dimensional model at the photography time of the image number 002 by using this multi-viewpoint image set 200-2 in the second time of the repetitive processing.

Thereafter, the image number is similarly updated in the third and subsequent times of the repetitive processing in all of cameras 100-1 to 100-5. In this manner, generator 240 can reconstruct the three-dimensional model of each time. However, since the three-dimensional reconstruction is independently performed at each time, the coordinate axes and the scale do not necessarily match in a plurality of reconstructed three-dimensional models. Therefore, generator 240 aligns the coordinate axes and scale of each time, so as to obtain the three-dimensional model of a moving subject.

Obtainer 230 can also create the multi-viewpoint image set by using the multi-viewpoint video obtained without assuming the synchronous photography. In that case, the photography time is given to each real viewpoint image, and obtainer 230 creates the multi-viewpoint image set in which a synchronous image and an asynchronous image, etc. are combined based on the photography time. Hereinafter, a description is given of a method of determining the synchronous image and the asynchronous image by using each photography time of two cameras 100-1 and 100-2.

For example, the photography time of the real viewpoint image selected from camera 100-1 is represented as $T_1$, and the photography time of the real viewpoint image selected from camera 100-2 is represented as $T_2$. Additionally, the exposure time period of camera 100-1 is represented as $T_{E1}$, and the exposure time period of camera 100-2 is represented as $T_{E2}$. Here, the photography times $T_1$ and $T_2$ are the time at which the exposure is started in the examples of FIG. 3A and FIG. 3B, i.e., the times of rising of the rectangle signal.

In this case, the exposure end time of camera 100-1 is $T_1+T_{E1}$. Then, when Formula 1 or Formula 2 is established, two cameras 100-1 and 100-2 are photographing the subject at the same time, and two real viewpoint images are synchronous images.

$$T_1 \leq T_2 \leq T_1+T_{E1} \quad \text{(Formula 1)}$$

$$T_1 \leq T_2+T_{E2}T_1+T_{E1} \quad \text{(Formula 2)}$$

Figure 7:
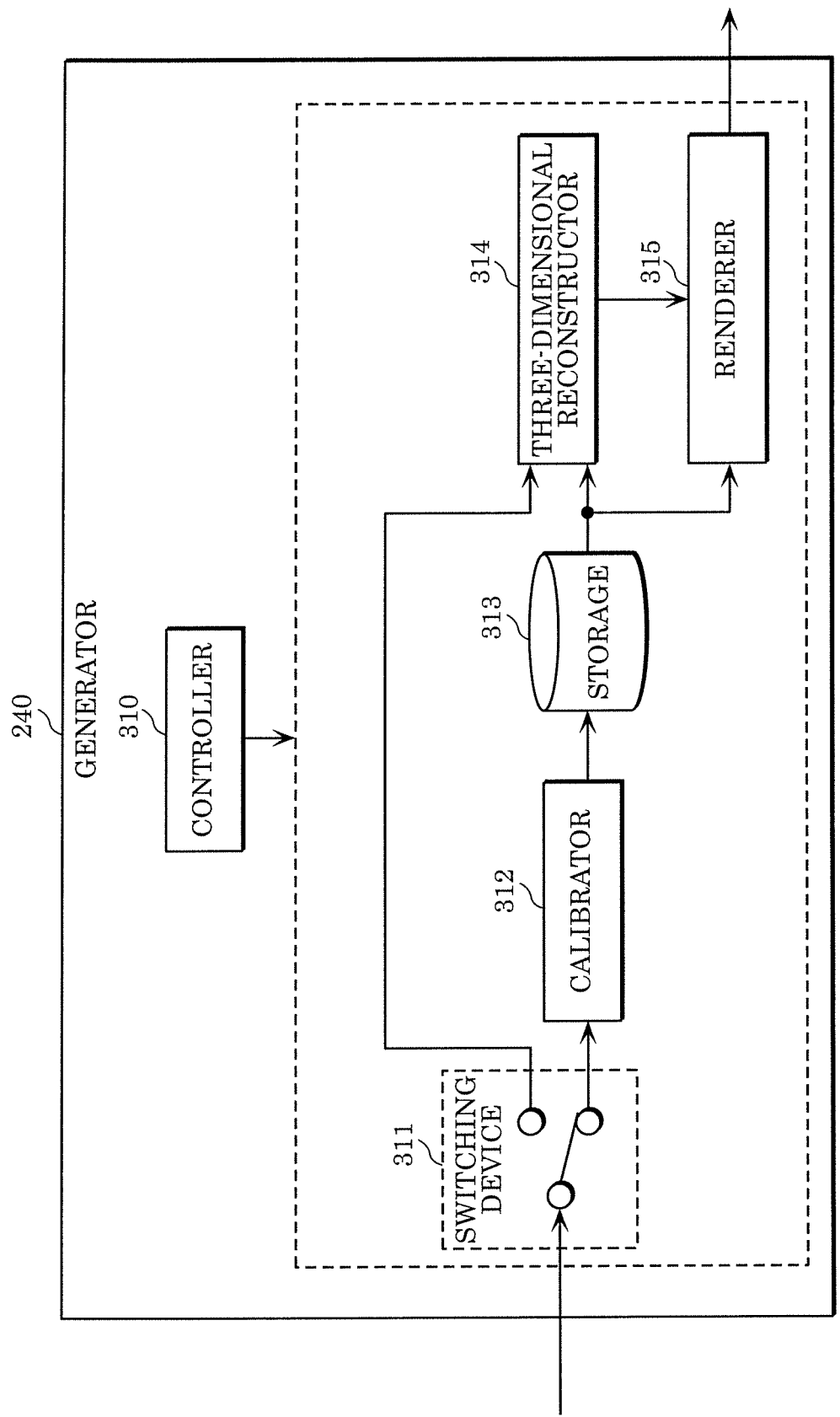
FIG. 7 is a block diagram of a generator according to an embodiment.

FIG. 7 is a block diagram showing the structure of generator 240 shown in FIG. 4. Generator 240 includes controller 310, switching device 311, calibrator 312, storage 313, three-dimensional reconstructor 314, and renderer 315.

Controller 310 determines whether or not calibration is required, and controls switching device 311 according to the result. Whether or not calibration is required may be determined according to whether or not the camera parameters exist in storage 313, may be specified by a user, or may be determined according to the performance of the camera parameters stored in storage 313.

Note that the performance of the camera parameters may be evaluated by using the correspondence between the characteristic point on an input image to three-dimensional reconstructor 314 and its three-dimensional point. Specifically, the performance of the camera parameters may be evaluated by whether or not a re-projection error obtained by calculating the error between a re-projected point obtained by re-projecting the three-dimensional point on the input image and the characteristic point is equal to or smaller than an arbitrary threshold value. Additionally, the performance of the camera parameters may be evaluated by the image quality of the free-viewpoint video generated by renderer 315.

Switching device 311 outputs the input multi-viewpoint image set to calibrator 312 or three-dimensional reconstructor 314 according to the control performed by controller 310. Switching device 311 may be configured to output the input multi-viewpoint image set to both calibrator 312 and three-dimensional reconstructor 314 according to the control performed by controller 310. For example, switching device 311 may switch the output destination among calibrator 312, three-dimensional reconstructor 314, or both calibrator 312 and three-dimensional reconstructor 314.

Calibrator 312 estimates the camera parameters including a lens distortion coefficient, the internal parameter, and the external parameter for each camera, and stores the estimated camera parameters in storage 313.

The real viewpoint image in which a pattern such as a checkered board was photographed may be used for the estimation. Then, the camera parameters may be estimated by calculating a perspective projection matrix by using the correspondence between a two-dimensional point and a three-dimensional point. Alternatively, the camera parameters may be estimated from the multi-viewpoint image set in which a general scene was photographed and structure from motion (SfM).

Note that calibrator 312 may individually estimate the lens distortion coefficient, the internal parameter, and the external parameter by using separate multi-viewpoint image sets. Additionally, calibrator 312 may estimate all the values of the camera parameters at once by using one multi-viewpoint image set. Alternatively, calibrator 312 may estimate the camera parameters by using a plurality of multi-viewpoint image sets. Additionally, synchronous photography may not be performed in photography of the pattern, such as a checkered board.

Three-dimensional reconstructor 314 generates the three-dimensional model of a scene. Three-dimensional reconstructor 314 may collectively generate the three-dimensional models of a plurality of objects in a scene, or may divide a subject (i.e., a foreground object) and a background object in a scene, and individually generate three-dimensional models. Additionally, three-dimensional reconstructor 314 may divide a plurality of objects in a scene into a plurality of groups, and generate a three-dimensional model for each of the groups.

Three-dimensional reconstructor 314 may generate a three-dimensional model for each target by using the volume intersection method (VIM) or the space carving method (SCM) as the three-dimensional reconstruction method.

Alternatively, three-dimensional reconstructor 314 may generate the three-dimensional model of an entire scene by using the patch-based multi-view stereo (PMVS) as the three-dimensional reconstruction method.

Figure 8:
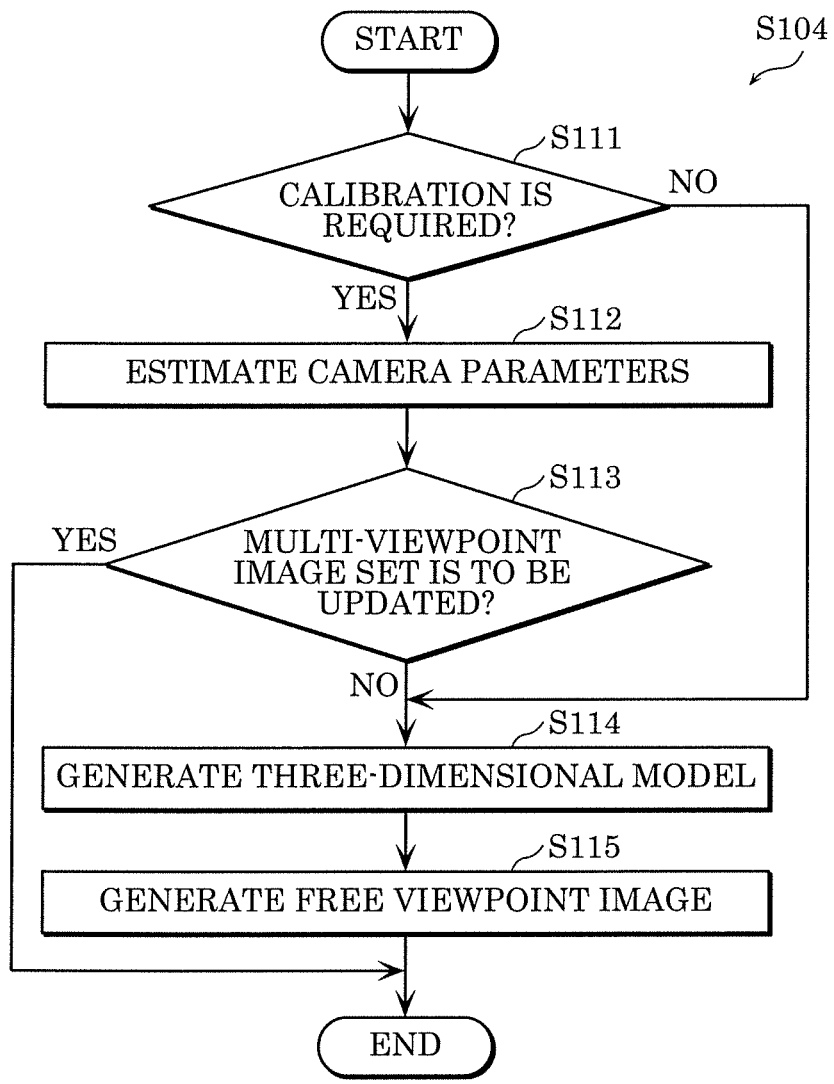
FIG. 8 is a flowchart showing the processing by the generator according to the embodiment.

FIG. 8 is a flowchart showing the operation of generator 240 shown in FIG. 7. The operation shown in FIG. 8 corresponds to the generation of the free-viewpoint image shown in FIG. 5 (S104). Generator 240 performs the operation shown in FIG. 8 for each multi-viewpoint image set.

In the operation shown in FIG. 8, first, controller 310 determines whether or not calibration is required, and controls switching device 311 according to the result. When calibration is required (Yes in S111), controller 310 controls switching device 311 to output the input multi-viewpoint image set to calibrator 312. When calibration is not required (No in S111), controller 310 controls switching device 311 to output the input multi-viewpoint image set to three-dimensional reconstructor 314.

Then, when calibration is required (Yes in S111), calibrator 312 estimates the camera parameters by using the multi-viewpoint image set, and stores the estimated camera parameters in storage 313 (S112). Then, controller 310 determines whether to update the multi-viewpoint image set, or to perform the generation of a three-dimensional model and a virtual viewpoint image by using the multi-viewpoint image set used for the estimation of the camera parameters.

When it is determined that the multi-viewpoint image set is to be updated (Yes in S113), generator 240 terminates the operation for the present multi-viewpoint image set. In this manner, the operation for the next multi-viewpoint image set is started. When it is determined that the generation of a three-dimensional model and a virtual viewpoint image is to be performed by using the multi-viewpoint image set used for the estimation of the camera parameters (No in S113), controller 310 controls switching device 311 to output a multi-viewpoint image set to three-dimensional reconstructor 314.

Note that, as described above, switching device 311 may be configured to output a multi-viewpoint image set to both calibrator 312 and three-dimensional reconstructor 314 according to the control performed by controller 310. Then, when the multi-viewpoint image set is used for the estimation of the camera parameters, and for the generation of a three-dimensional model and a virtual viewpoint image, switching device 311 may output a multi-viewpoint image set to both calibrator 312 and three-dimensional reconstructor 314.

Then, three-dimensional reconstructor 314 generates the three-dimensional model of a scene by using the multi-viewpoint image set and the camera parameters (S114). Next, renderer 315 generates a virtual viewpoint image as a free-viewpoint video by using the multi-viewpoint image set, the camera parameters, and the three-dimensional model (S115).

Figure 9:
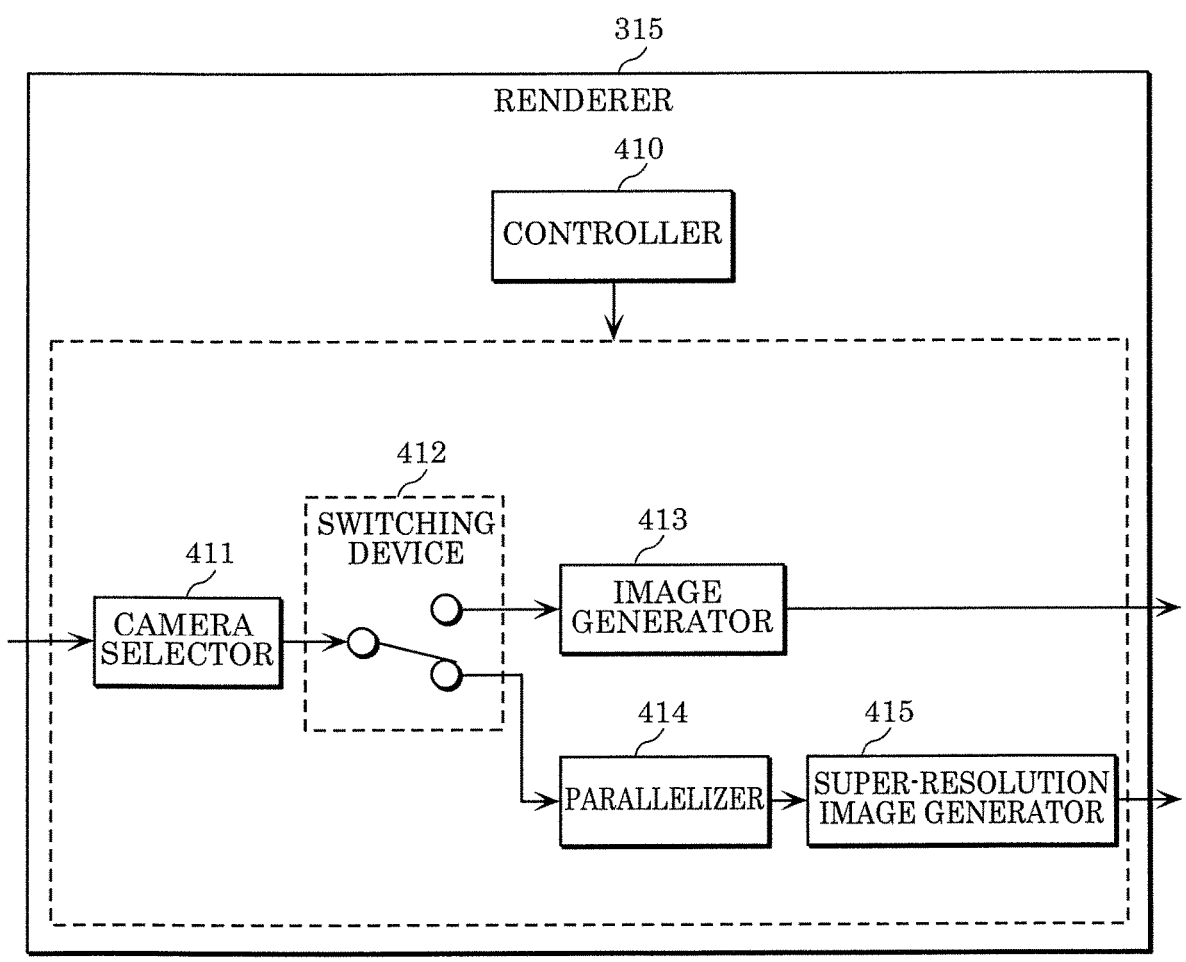
FIG. 9 is a block diagram of a renderer according to an embodiment.

FIG. 9 is a block diagram showing the structure of renderer 315 shown in FIG. 7. Renderer 315 includes controller 410, camera selector 411, switching device 412, image generator 413, parallelizer 414, and super-resolution image generator 415.

Rendering means generating an image from data etc. described with a data description language. Renderer 315 generates a virtual viewpoint image by performing rendering by using a multi-viewpoint image set, the camera parameters, and a three-dimensional model.

When the point group of a three-dimensional model with color information is dense enough, or when a three-dimensional model with color information is represented in respect of a mesh, etc., renderer 315 can generate a virtual viewpoint image by photographing the three-dimensional model with a virtual camera. That is, in this case, renderer 315 can generate a virtual viewpoint image by calculating the map corresponding to projection of the three-dimensional model to the image surface of the virtual camera, by using the camera parameters of the virtual camera.

Additionally, when the three-dimensional model is not represented in respect of a mesh, etc., and the point group of the three-dimensional model is sparse, or the three-dimensional model does not have color information, renderer 315 uses a real viewpoint image in addition to the three-dimensional model. Specifically, renderer 315 calculates the corresponding pixel, which is the pixel corresponding to a generation target pixel of a virtual viewpoint image in a real viewpoint image, with the three-dimensional model and the camera parameters. Then, renderer 315 generates the virtual viewpoint image by using the corresponding pixel of the real viewpoint image and its surrounding pixels.

Basically, renderer 315 generates a virtual viewpoint image with a rendering method that uses both a three-dimensional model and a real viewpoint image. Hereinafter, the real viewpoint image used for rendering may be represented as an input image, and the virtual viewpoint image may be represented as an output image.

Controller 410 determines whether or not to perform super-resolution processing, for example. Specifically, controller 410 may compare the required resolution $R_O$ of an output image and the real resolution $R_I$ of an input image, and when the required resolution $R_O$—the real resolution $R_I$ exceeds an arbitrary threshold value, controller 410 may determine that the super-resolution processing is to be performed. Alternatively, when the magnification of the output image with respect to the input image exceeds an arbitrary threshold value, i.e., when the magnification of the zoom of the virtual camera is larger than the threshold value, controller 410 may determine that the super-resolution processing is to be performed.

Then, controller 410 controls switching device 412 based on the determination result. In this manner, when the super-resolution processing is performed, controller 410 operates parallelizer 414 and super-resolution image generator 415, and when the super-resolution processing is not performed, controller 410 operates image generator 413. Note that controller 410 may determine whether or not to perform the super-resolution processing, based on an instruction from the user of free-viewpoint video generating system 200. Additionally, free-viewpoint video generating system 200 may include an interface for obtaining the instruction from the user.

Here, the resolution corresponds to the density of a pixel, and corresponds to the fineness of an image. The higher the resolution of an image is, the higher the frequency component included in the image may become. Therefore, the super-resolution processing corresponds to the generation of an image constructed by high frequency components from an image constructed by low frequency components.

Camera selector 411 selects one or more real cameras used for the rendering of a virtual viewpoint image from a plurality of real cameras. Specifically, for example, camera selector 411 selects the real camera with which at least a part of a visual field overlaps with a virtual camera. Alternatively, camera selector 411 may separately select the real camera that photographed an image including an area overlapping with an area requiring the super-resolution processing in a virtual viewpoint image, and the real camera that photographed an image including an area overlapping with an area not requiring the super-resolution processing. Note that the real camera selected in both may exist.

Note that camera selector 411 basically selects two or more real cameras. However, camera selector 411 may select one real camera depending on the position of the virtual camera, etc.

Additionally, camera selector 411 may select a plurality of real cameras whose positions or orientations are close to the position or orientation of the virtual camera. For example, camera selector 411 may select a plurality of real cameras whose position differences with respect to the virtual camera are within a predetermined distance range, and whose orientation differences with respect to the virtual camera are within a predetermined angular range. Additionally, camera selector 411 may select a predetermined number of real cameras according to their closeness in the positions with respect to the virtual camera, or according to their closeness in the orientations with respect to the virtual camera.

Additionally, the super-resolution processing may be performed on the area where visual fields of the plurality of real cameras selected by camera selector 411 overlap with each other, and the super-resolution processing may not be performed on the area where the visual field of the plurality of real cameras do not overlap with each other.

Switching device 412 outputs respective real viewpoint images of the one or more selected real cameras, respective camera parameters of the one or more selected real cameras, and the three-dimensional model to image generator 413 or parallelizer 414 according to the control performed by controller 410.

Image generator 413 generates an output image, which is a virtual viewpoint image, by performing rendering processing by using input images, which are the respective real viewpoint images of the one or more selected real cameras, the three-dimensional model, and the respective camera parameters of the one or more selected real cameras.

For example, image generator 413 calculates the corresponding pixel, which is the pixel corresponding to the generation target pixel of the virtual viewpoint image in the real viewpoint image, with the three-dimensional model and the camera parameters. Then, image generator 413 generates the virtual viewpoint image by estimating the pixel value of the generation target pixel of the virtual viewpoint image by using the pixel value of the corresponding pixel of the real viewpoint image, and the pixel values of the surrounding pixels of the corresponding pixel.

Additionally, for example, image generator 413 may calculate a plurality of corresponding positions in a plurality of real viewpoint images for each pixel or each block in the virtual viewpoint image. Then, image generator 413 may generate the virtual viewpoint image for each pixel or each block by calculating the weighting sum of a plurality of pixel components included in a plurality of small areas that include a plurality of corresponding positions in a plurality of real viewpoint images in their centers. Note that, instead of the weighting sum, image generator 413 may use a simple average, or may use a representative values, such as a central value, for the generation of a virtual viewpoint image.

Parallelizer 414 performs parallelization of each real viewpoint image, and outputs each parallelized real viewpoint image as an input image to super-resolution image generator 415. Additionally, parallelizer 414 outputs the three-dimensional model and the camera parameters that are output from switching device 412 to super-resolution image generator 415. The parallelization performed by parallelizer 414 will be described later with reference to FIG. 11A and FIG. 11B, etc.

Super-resolution image generator 415 generates an output image, which is a virtual viewpoint image, by performing rendering processing by using the input image, the three-dimensional model, and the camera parameters. Although the basic operation of super-resolution image generator 415 is the same as the operation of image generator 413, super-resolution image generator 415 generates an output image with high resolution by performing the super-resolution processing. The super-resolution processing will be described later with reference to FIG. 12, etc.

Note that camera selector 411 may be included in any of image generator 413, parallelizer 414, and super-resolution image generator 415. Then, the optimum real camera may be properly selected according to the position of the virtual camera, etc., and rendering processing may be performed.

Figure 10:
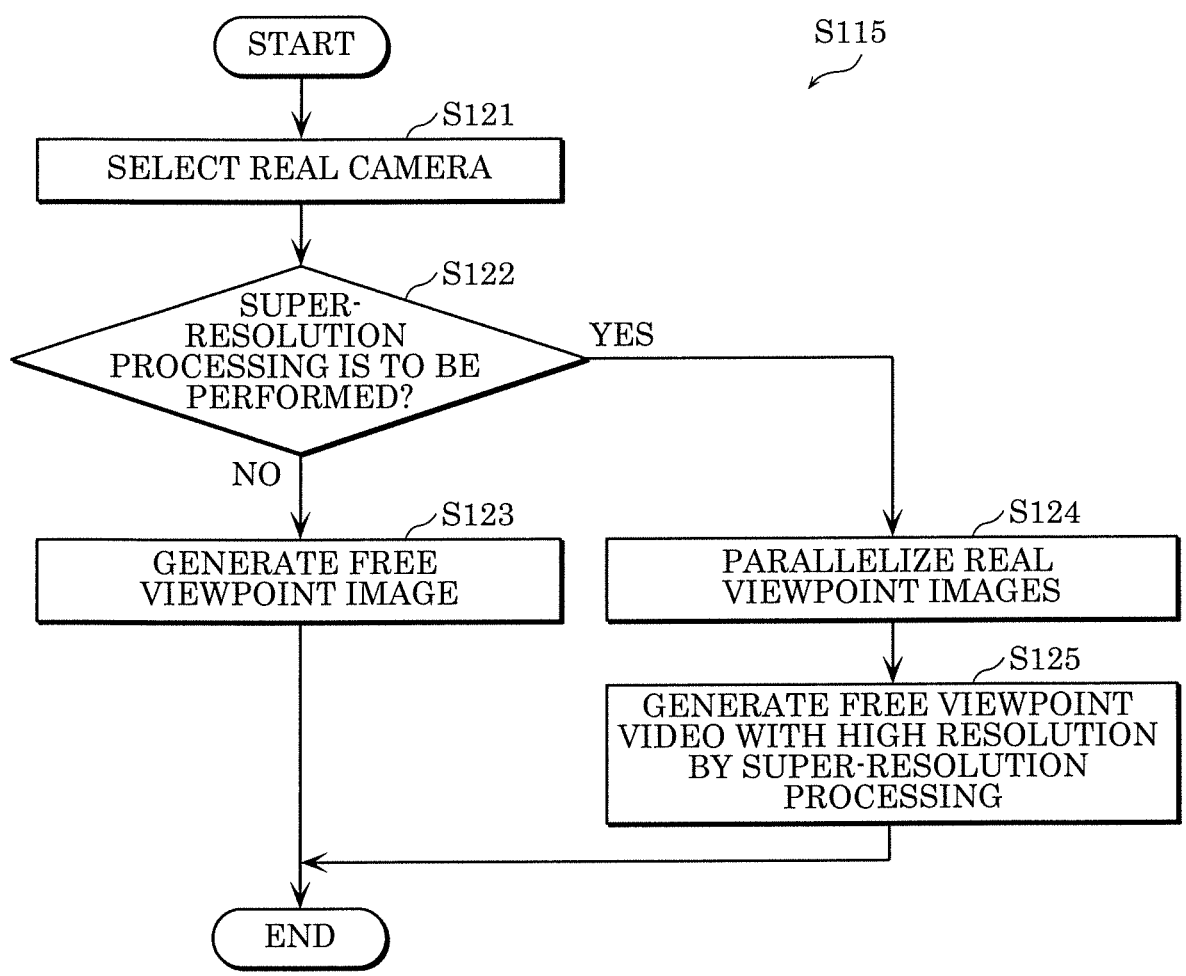
FIG. 10 is a flowchart showing the processing by the renderer according to the embodiment.

FIG. 10 is a flowchart showing operation of renderer 315 shown in FIG. 9. The operation shown in FIG. 10 corresponds to the generation of the free-viewpoint image shown in FIG. 8 (S115). Renderer 315 performs the operation shown in FIG. 10 for each multi-viewpoint image set.

In the operation shown in FIG. 10, first, camera selector 411 selects a plurality of real cameras used for rendering from a plurality of real cameras, according to the position and orientation of the virtual camera (S121).

Then, controller 410 determines whether or not to perform the super-resolution processing, and controls switching device 412 according to the result. Controller 410 may determine whether or not to perform the super-resolution processing according to the position and orientation of each of the plurality of real cameras selected by camera selector 411, and the position and orientation of the virtual camera. Specifically, when a plurality of real cameras whose positions and orientations are close to the position or orientation of the virtual camera are selected, controller 410 may determine that the super-resolution processing is to be performed.

When the super-resolution processing is not performed (No in S122), controller 410 controls switching device 412 so that the respective real viewpoint images of the plurality of selected real cameras, and the three-dimensional model, etc. are output to image generator 413. Then, image generator 413 generates a virtual viewpoint image as a free-viewpoint image by performing rendering processing by using the respective real viewpoint images of the plurality of selected real cameras, and the three-dimensional model, etc. (S123). In this manner, image generator 413 generates the virtual viewpoint image having the same resolution as the resolution of the respective real viewpoint image as a free-viewpoint image.

When the super-resolution processing is performed (Yes in S122), controller 410 controls switching device 412 so that the respective real viewpoint images of the plurality of selected real cameras, and the three-dimensional model, etc. are output to parallelizer 414. Then, parallelizer 414 parallelizes the plurality of real viewpoint images of the plurality of selected real cameras (S124). That is, parallelizer 414 converts the plurality of real viewpoint images of the plurality of selected real cameras, so as to generate a plurality of parallelized real viewpoint images.

Then, super-resolution image generator 415 performs the super-resolution processing to generate a virtual viewpoint image with high resolution as a free-viewpoint image (S125). For example, super-resolution image generator 415 generates the virtual viewpoint image having a higher resolution than the resolution of each real viewpoint image as the free-viewpoint image by performing rendering processing accompanied by the super-resolution processing by using the plurality of parallelized real viewpoint images.

Next, a description will be given of the parallelization performed by parallelizer 414 shown in FIG. 9. In the super-resolution processing, a plurality of blocks whose positions are slightly shifted from each other are used in a plurality of real viewpoint images obtained from a plurality of real cameras close to the virtual camera. Therefore, for example, matching processing is performed in the unit of pixels or in the unit of blocks between the real viewpoint images.

As for the matching in the unit of pixels, there is a method of using feature vectors obtained by extracting the feature amounts from a focus pixel and its surrounding pixels, and vectorizing the feature amounts. However, with this method, the calculation amount required for extracting the feature amounts becomes enormous. Additionally, a highly precise matching result is not obtained except for characteristic pixels, such as the corners of a subject included in a real viewpoint image.

Additionally, also as for the matching in the unit of blocks, with a plurality of real cameras that are freely arranged, a plurality of optical axes of the plurality of cameras cross with each other. Therefore, since a plurality of real viewpoint images include respectively different distortion, a highly precise matching result is not obtained.

Therefore, as pre-processing of the super-resolution processing, parallelizer 414 parallelizes the plurality of real viewpoint images of the plurality of selected real cameras by using a plurality of camera parameters of the plurality of selected real cameras. In this manner, fast and highly precise block matching becomes possible.

Note that a plurality of reference areas corresponding to the processing target area of a virtual viewpoint image in a plurality of real viewpoint images can be specified by using a three-dimensional model. That is, in a plurality of real viewpoint images, a plurality of blocks whose positions are slightly shifted from each other can be specified by using a three-dimensional model. Therefore, parallelization can be omitted. However, in the generation of a high resolution image, parallelization is effective not only for the matching processing, but also for the super-resolution processing.

Figure 11A:
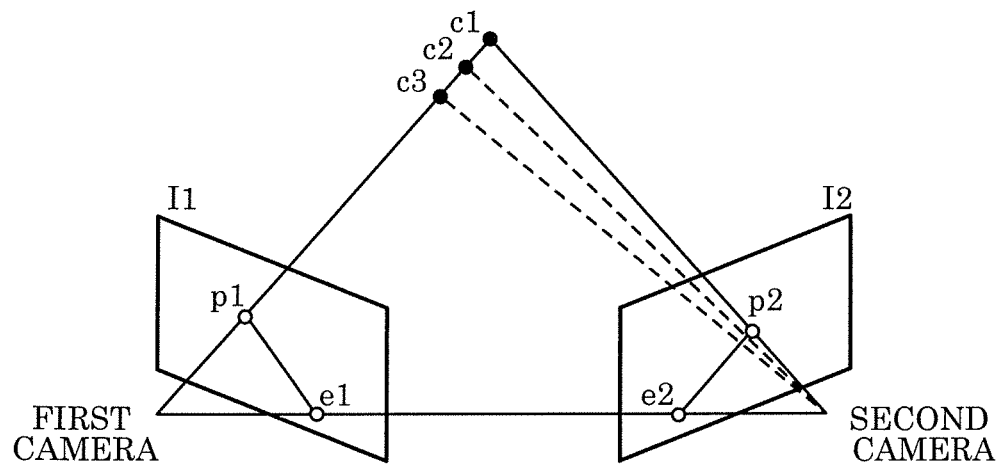
FIG. 11A is a schematic diagram showing two images before parallelization according to an embodiment.
Figure 11B:
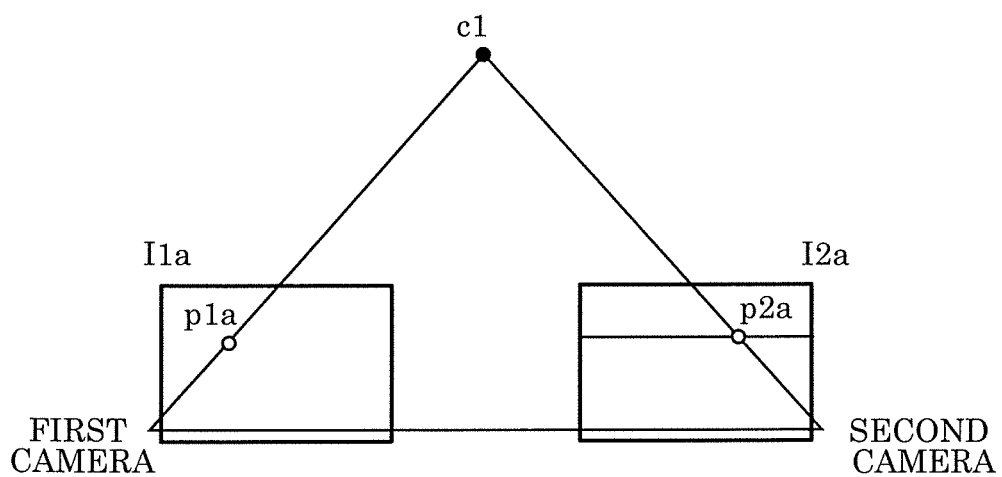
FIG. 11B is a schematic diagram showing the two images after the parallelization according to the embodiment.

FIG. 11A and FIG. 11B are diagrams for describing a method of parallelization. As shown in FIG. 11A, intersection points e1 and e2 of the straight line connecting the position of a first camera and the position of a second camera, and image flat surfaces I1 and I2 of first camera and second camera, respectively, are called epipoles. Additionally, a flat surface including three-dimensional point c1, the position of first camera, and the position of second camera is called an epipolar plane. Straight-lines p1-e1 and p2-e2 at which the epipolar plane and image flat surfaces I1 and I2 cross are called epipolar lines.

Image flat surface I1 corresponds to the real viewpoint image of first camera, and image flat surface I2 corresponds to the real viewpoint image of second camera. Three-dimensional points c1, c2, and c3 are projected on the same point p1 in image flat surface I1 of first camera. On the other hand, in image flat surface I2 of second camera, the point corresponding to point p1 exists on the epipolar line.

Additionally, a plurality of epipolar planes corresponding to a plurality of three-dimensional points that do not exist in the same epipolar plane may exist. Then, each of image flat surfaces I1 and I2 may include a plurality of epipolar lines corresponding to a plurality of epipolar planes.

When the optical axis of first camera and the optical axis of second camera are parallel, the two image flat surfaces I1 and I2 are parallel, and a plurality of epipolar lines in each of the two image flat surfaces I1 and I2 are parallel. On the other hand, when the optical axis of first camera and the optical axis of second camera are not parallel, the two image flat surfaces I1 and I2 are not parallel, and a plurality of epipolar lines in each of the two image flat surfaces I1 and I2 are not parallel.

Parallelizer 414 parallelizes the two image flat surfaces I1 and I2 by converting an image by using the lens distortion coefficient, the internal parameter, and the external parameter that are estimated in calibrator 312. That is, parallelizer 414 parallelizes a plurality of epipolar lines in each of the two image flat surfaces I1 and I2 by performing conversion of an image.

Parallelizing a plurality of images corresponds to parallelizing a plurality of image flat surfaces, and corresponds to performing processing that is equivalent to parallelizing a plurality of epipolar lines in each two images of a plurality of images. Additionally, parallelizing a plurality of images corresponds to converting a plurality of images into such as a plurality of images photographed by a plurality of cameras with parallel optical axes, i.e., a plurality of images having parallel view field directions. For example, parallelizer 414 parallelizes each image by parallelizing the epipolar line and the horizontal axis of each image, as shown in FIG. 11B.

Parallelizer 414 may perform parallelization by homography conversion that uses a homography matrix to the respective images of first camera and second camera. In this manner, for example, the epipoles are converted into arbitrary points. Then, in each image, all epipolar lines become parallel to the horizontal coordinate axis in the image, and two images are converted so that a plurality of points corresponding between images exist in the same ordinate position in the image.

For example, the homography matrix for parallelizing the real viewpoint image of first camera is represented as $H_1$, and the homography matrix for parallelizing the real viewpoint image of second camera is represented as $H_2$. Additionally, a point on image flat surface I1 before parallelization is represented as $x_1$, and a point on image flat surface I1a after parallelization is represented as follows.

$$\overline{x_1}$$ [Math. 1]

Similarly, a point on image flat surface I2 before parallelization is represented as $x_2$, and a point on image flat surface I2a after parallelization is represented as follows.

$$\overline{x_2}$$ [Math 2]

In this case, the following Formula 3 and Formula 4 are established.

[Math. 3]

$$\overline{x_1} = H_1 x_1 \qquad \text{(Formula 3)}$$

[Math. 4]

$$\overline{x_2} = H_2 x_2 \qquad \text{(Formula 4)}$$

Additionally, when the basic matrix representing the relationship between image flat surface I1a and image flat surface I2a after parallelization is represented as $$\overline{F}$$ [Math. 5]

the following Formula 5 is established for $x_1$ and $x_2$, which are the points corresponding to each other.

[Math. 6]

$$\overline{x_2}^T \overline{F} \overline{x_1} = 0 \qquad \text{(Formula 5)}$$

Note that $$\overline{x_2}^T \quad \text{[Math. 7]}$$

represents the transposed vector of $$\overline{x_2} \quad \text{[Math. 8]}$$

The following Formula 6 is obtained by applying Formula 3 and Formula 4 to Formula 5.

[Math. 9]

$$x_2^T H_2^T \overline{F} H_1 x_1 = 0 \quad \text{(Formula 6)}$$

Here, when the basic matrix representing the relationship between image flat surface I1 and image flat surface I2 before parallelization is represented as F, since $x_2^T F x_1 = 0$ is established for mutually corresponding $x_1$ and $x_2$, Formula 7, which is the relational expression between the basic matrix F and homography matrices $H_1$ and $H_2$, is obtained from Formula 6.

[Math. 10]

$$F = H_2^T \overline{F} H_1 \quad \text{(Formula 7)}$$

Note that homography matrix $H_1$ is represented as Formula 8.

[Math. 11]

$$H_1 = \begin{bmatrix} u_1^T \\ v_1^T \\ w_1^T \end{bmatrix} \quad \text{(Formual 8)}$$

Then, the following Formulas 9 is established for $u_1$, $v_1$, and $w_1$ of $H_1$.

$$H_1 e_1 = [u_1^T e_1 \, v_1^T e_1 \, w_1^T e_1]^T = [1 0 0]^T \quad \text{(Formula 9)}$$

Formula 9 means that epipole $e_1$ is converted into the position that is infinite in the horizontal direction in an image flat surface. Additionally, Formula 9 means that the straight line having $v_1$ as a linear coefficient, and the straight line having $w_1$ as a linear coefficient include epipole $e_1$. In addition, this relationship is also the same for homography matrix $H_2$ and epipole $e_2$.

As for the two corresponding points, the positions of the ordinates after parallelization match. Therefore, the basic matrix of Formula 7

$$\overline{F} \quad \text{[Math. 12]}$$

is defined as an antisymmetric matrix $A_x$ as Formula 10.

[Math. 13]

$$\overline{F} = A_x = \begin{bmatrix} 0 & 0 & 0 \\ 0 & 0 & -1 \\ 0 & 1 & 0 \end{bmatrix} \quad \text{(Formula 10)}$$

Formula 11 is obtained from Formula 7 and Formula 10.

$$F = H_2^T A_x H_1 \quad \text{(Formula 11)}$$

The basic matrix F can be calculated from the internal parameters and the external parameters of first camera and second camera. On the other hand, homography matrices $H_1$ and $H_2$ cannot be uniquely obtained by Formula 11. Therefore, parallelizer 414 may search for homography matrices $H_1$ and $H_2$ that make distortion of the image after parallelization the smallest, by using Formula 9 as a restriction condition.

Here, homography conversion is performed to both of two real viewpoint images of first camera and second camera, which forms a pair, and parallelization is performed. However, either of homography matrices $H_1$ and $H_2$ of Formula 11 may be an identity matrix. That is, parallelizer 414 may perform the parallelization processing by performing homography conversion to the real viewpoint image of one of the cameras by using the real viewpoint image of the other of the cameras as the reference.

Figure 12:
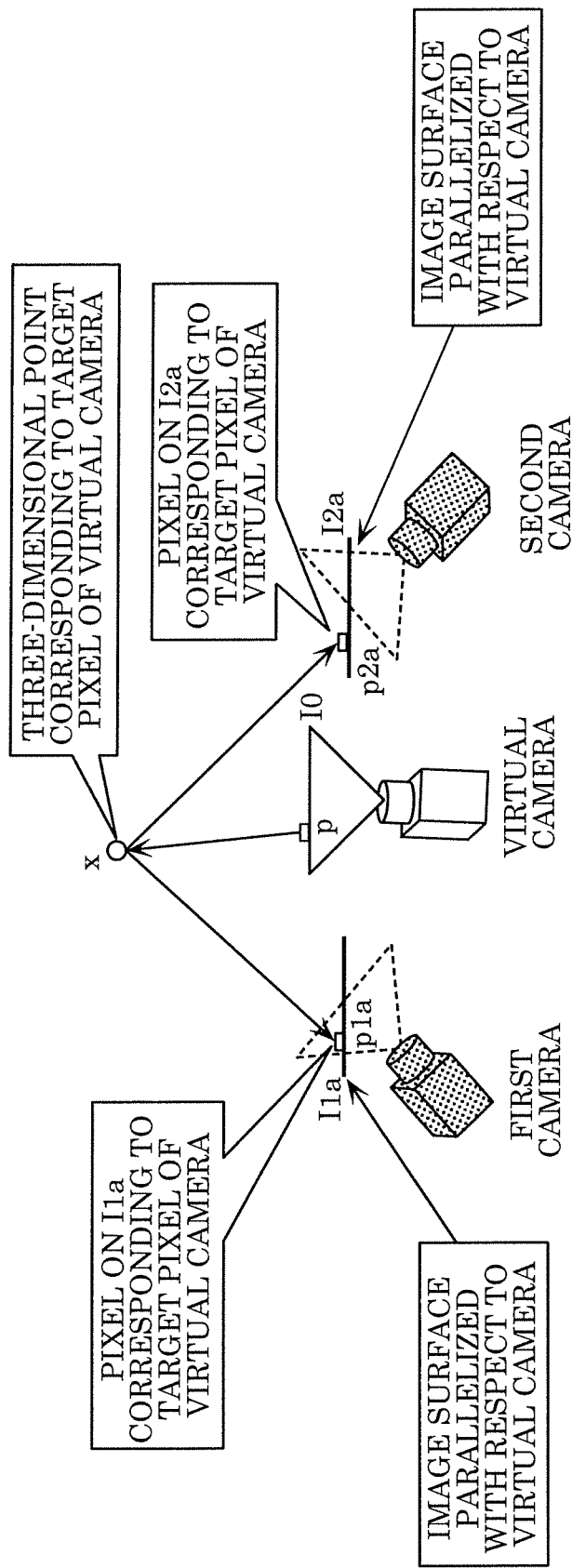
FIG. 12 is a diagram showing the relationship among a processing target pixel, a three-dimensional point, and a plurality of corresponding pixels according to an embodiment.

FIG. 12 is a diagram showing the relationship among a processing target pixel, a three-dimensional point, and a plurality of corresponding pixels. Parallelizer 414 performs the parallelization processing so that, for example, the respective image flat surfaces of a plurality of cameras selected by camera selector 411 become parallel to image flat surface I0 of the virtual camera as shown in FIG. 12. A plurality of epipolar lines are parallelized in image flat surfaces I1a and I2a obtained by the parallelization processing. Super-resolution image generator 415 performs the super-resolution processing by using the parallelized image flat surfaces I1a and I2a.

Specifically, super-resolution image generator 415 calculates pixels p1a and p2a corresponding to a generation target pixel p on image flat surface I0 of the virtual camera in the parallelized image flat surfaces I1a and I2a by using the three-dimensional model.

For example, super-resolution image generator 415 may calculate three-dimensional point x corresponding to the generation target pixel p on image flat surface I0 of the virtual camera, by using the three-dimensional model and the camera parameters of the virtual camera. Specifically, the position of three-dimensional point x projected on the position of the generation target pixel p on image flat surface I0 may be calculated by calculating the map that projects the three-dimensional model on image flat surface I0 defined based on the position and orientation, etc. of the virtual camera.

Then, super-resolution image generator 415 may calculate pixels p1a and p2a corresponding to three-dimensional point x in image flat surfaces I1a and I2a by using the three-dimensional model and the camera parameters of the respective selected real cameras.

Specifically, the positions of pixels p1 and p2 where three-dimensional point x is projected on image flat surfaces I1 and I2 may be calculated by calculating the map that projects the three-dimensional model on image flat surfaces I1 and I2 defined based on the positions and orientations, etc. of the respective selected real cameras. Furthermore, the positions of pixels p1a and p2a on the parallelized image flat surfaces I1a and I2a may be calculated by homography conversion, etc. based on the positions of pixels p1 and p2 on image flat surfaces I1 and I2, respectively.

With the calculation processing as described above, super-resolution image generator 415 can calculate pixels p1a and p2a corresponding to the generation target pixel p on image flat surface I0 of the virtual camera in image flat surfaces I1a and I2a by using the three-dimensional model.

Note that parallelizer 414 may make K(K−1)/2 set of pairs in K cameras selected by camera selector 411, and perform parallelization for each of the pairs. Alternatively, parallelizer 414 may make K−1 set of pairs formed by the camera whose position or orientation is closest to the position or orientation of the virtual camera in K cameras, and each of the K−1 remaining cameras, and may perform parallelization for each of the pairs.

The super-resolution processing may be formed by two kinds of processing, i.e., the matching processing and the reconstruction processing. Here, a plurality of input images in the super-resolution processing may be considered to be the deteriorated images of the high resolution image to be output. Since the processing of generating a high resolution image corresponds to the processing of reconstructing the original high resolution image by using a plurality of low resolution images that are a plurality of input images, the processing of generating a high resolution image is called the reconstruction processing.

First, a description will be given of the matching processing performed by using the relationship between the two images parallelized as shown in FIG. 12. In the parallelized image flat surfaces I1a and I2a of the camera pair, pixels p1a and p2a corresponding to the generation target pixel p on image flat surface I0 of the virtual camera are obtained. Super-resolution image generator 415 may perform the super-resolution processing by using blocks formed by pixels p1a and p2a, and respective surrounding pixels.

Alternatively, in order to further increase the effect obtained by the super-resolution processing, super-resolution image generator 415 may perform block matching in the unit of subpixels. On that occasion, the image of a camera whose position or orientation is close to the position or orientation of the virtual camera may be fixed as a target image, and a block on the target image may be fixed as a target block. Then, search may be performed by using the image of a distant camera as a reference image, and using a block on the reference image as a reference block.

Additionally, for example, the block having the pixel p1a on image flat surface I1a as a main pixel may be fixed as a target block, and the reference block may be searched from the surrounding of the pixel p2a on image flat surface I2a.

The block matching methods in the units of subpixels include a pixel-based method, and an index-based method.

In the pixel-based method, the target image and the reference image are upsampled to a desired search accuracy, and the reference block is searched whose error absolute value sum or error square sum of pixel components in the reference block with respect to pixel components in the target block is minimum.

In the index-based method, as in the pixel-based method, the target image and the reference image are upsampled to a desired search accuracy. Then, the pixel component in a block is not directly used, and the reference block is searched that matches most with a secondary function obtained from the pixel component on the side of the target block. This method is called the similarity interpolation method. Alternatively, search is performed by using the NCC (Normalized Cross Correlation), which can be calculated from the pixel components in the target block and the reference block, etc. as an evaluation index.

Formula 12 represents the formula for calculating the NCC. In Formula 12, the block size is M×N pixels. Additionally, f(i, j) and g(i, j) represent the pixel values in the target block and the reference block, respectively.

$$\bar{f}$$ [Math. 14]

and $$\bar{g}$$ [Math. 15]

represent the pixel value averages in the target block and the reference block, respectively. (dx, dy) represents the pixel position at the upper left of the reference block in the reference image.

[Math. 16]

$$NCC = \frac{\sum_{i=0}^{M}\sum_{j=0}^{N}(g(i+d_x, j+d_y)-\bar{g})(f(i,j)-\bar{f})}{\sqrt{\sum_{i=0}^{M}\sum_{j=0}^{N}g(i+d_x, j+d_y)^2}\sqrt{\sum_{i=0}^{M}\sum_{j=0}^{N}f(i,f)^2}}$$ (Formula 12)

The NCC of Formula 12 corresponds to the inner product of the pixel vector consisting of a plurality of pixel values in the target block, and the pixel vector consisting of a plurality of pixel values in the reference block. The maximum value of the NCC is 1, and the closer to 1 the NCC is, the more similar to each other the target block and the reference block are.

Additionally, the above-described method is an example, and the block matching method is not limited to this. For example, a secondary function may be applied to the position and pixel value in the target block, and the matching in the units of subpixel may be performed by parabola fitting on the reference image. Additionally, in the index-based method, after frequency conversion of the image is performed by Fourier transform, etc., the phase only correlation (POC) method may be used in which matching is performed in the area in which the amplitude spectrum is normalized.

Additionally, as described above, super-resolution image generator 415 may calculate three-dimensional point x corresponding to the generation target pixel p on image flat surface I0 of the virtual camera, by using the three-dimensional model and the camera parameters of the virtual camera. Then, super-resolution image generator 415 may calculate pixels p1 and p2 corresponding to three-dimensional point x using the camera parameters of the selected real camera in image flat surfaces I1 and I2 that are not parallelized.

According to the above, super-resolution image generator 415 may calculate pixels p1 and p2 corresponding to the generation target pixel p on image flat surface I0 of the virtual camera in image flat surfaces I1 and I2 that are not parallelized. That is, in a plurality of real viewpoint images, super-resolution image generator 415 may specify a plurality of blocks corresponding to the processing target block in the virtual viewpoint image, by using the three-dimensional model, without using a pixel value or an index value. Additionally, a plurality of real viewpoint images may not be parallelized.

Additionally, super-resolution image generator 415 may perform upsampling of a plurality of real viewpoint images, and may specify a plurality of blocks corresponding to the processing target block of the virtual viewpoint image with a subpixel accuracy in the plurality of upsampled real viewpoint images, by using the three-dimensional model.

Next, the reconstruction processing will be described. A plurality of blocks corresponding to the processing target blocks in a plurality of input images are obtained by the above-described processing. For example, super-resolution image generator 415 performs the reconstruction processing by using these blocks according to the maximum a posteriori estimation method (the MAP estimation method).

For example, in the MAP estimation method, a high resolution image is estimated by minimizing the evaluation function for the a posteriori probability of the high resolution image under the conditions by which a plurality of low resolution images are observed. That is, the reconstruction processing of a high resolution image is performed.

Specifically, the vector consisting of a plurality of pixel values included in the processing target block of a high resolution image is represented by x, and the vector consisting of pixel values included in a block of the i-th low resolution image among N observed low resolution images is represented by $y_i$. In this case, the a posteriori probability distribution p of the high resolution image $(x|y_1, y_2, \ldots, y_n)$ is represented by Formula 13 by using a likelihood distribution p $(y_i|x)$ and a priori probability distribution p(x).

[Math. 17]

$$p(x|y_1,y_2,L,y_n) \propto [\Pi_{i=1}^{N} p(y_i|x)p(x)] \quad \text{(Formula 13)}$$

Additionally, when the model in which a high resolution image is deteriorated to the i-th low resolution image due to the movement of a sensor or a subject, etc. is represented by a matrix $M_i$, the likelihood distribution p $(y_i|x)$ is represented by Formula 14.

[Math. 18]

$$p(y_i|x) \propto \exp\left(-\frac{\|y_i - M_i x\|^2}{2\sigma^2}\right) \quad \text{(Formula 14)}$$

Here, σ2 represents the variance value of noise. Additionally, when a highpass filter is represented by a matrix HPF, the a priori probability distribution p(x) of a high resolution image is represented by Formula 15.

[Math. 19]

$$p(x) \propto \exp\left(-\frac{\|HPFx\|^2}{2\varphi^2}\right) \quad \text{(Formula 15)}$$

Here, $\phi^2$ represents an adjustment parameter. In the MAP estimation method, the vector x of a high resolution image is reconstructed so that the a posteriori probability of Formula 13 is maximized. In terms of the ease of solving, Formula 16 is derived by applying Formula 14 and Formula 15 to the logarithm of Formula 13. In this manner, the vector x that maximizes the a posteriori probability of Formula 13 can be replaced to the vector x that minimizes the evaluation-function E(x) of Formula 16.

[Math. 20]

$$E(x) = [\Sigma_{i=0}^{N} \|y_i - M_i x\|^2] + \alpha \|HPFx\|^2 \quad \text{(Formula 16)}$$

Note that the matrix $M_i$ of the deterioration model and the matrix HPF of the highpass filter are treated as known. Moreover, $\alpha = \sigma^2/\phi^2$. That is, the unknown parameters are collected into one variable in Formula 16. The larger the α becomes, the smaller the noise becomes, but the less the super-resolution effect becomes. The smaller the α becomes, the larger the noise becomes, but the greater the super-resolution effect becomes.

The above-described method is an example, and the super-resolution method is not limited to the above-described method. For example, a method may be used that reconstructs a high frequency component by compounding mutually different aliasing components included in a plurality of low resolution images in a frequency domain. Additionally, the iterative back projection (IBP) method may be used as the method for image area.

In the IBP method, resolution enhancement is performed on the error image between the low resolution image estimated by the deterioration model as the forward projection of the high resolution image, which is a super-resolution image, and the observed low resolution image. Then, the back projection of the error image is performed by applying a back projection kernel to the error image. Then, a super-resolution image is updated by adding the error image to the current super-resolution image. A super-resolution image with a higher image quality is reconstructed by repeating this operation.

Additionally, the projection onto convex set (POCS) method may be used. In the POCS method, a super-resolution image is reconstructed by sequentially solving simultaneous equations including a plurality of equations representing the deterioration model from a high resolution image to a low resolution image, under the constraint condition that all of these equations can be differentiated.

Additionally, the point spread function (PSF) representing the blurring of the subject in an optical system may be used as the deterioration model.

Additionally, super-resolution image generator 415 may specify a plurality of blocks that fit to each other in a plurality of parallelized low resolution images by performing block matching on a plurality of parallelized low resolution images, without using a three-dimensional model. Then, super-resolution image generator 415 may estimate the pixel component of a block in a high resolution image from a plurality of pixel components of a plurality of specified blocks, without using a three-dimensional model.

When the respective positions and orientations of a plurality of real cameras that photographed a plurality of low resolution images are sufficiently approximate to the position and orientation of the virtual camera, it is assumed that the position of a block in each parallelized low resolution image corresponds to the position of a block in a high resolution image.

Additionally, the processing of parallelizing a real viewpoint image so that the real viewpoint image becomes parallel to a virtual viewpoint image is the processing that resembles converting a real viewpoint image into an image seen from a virtual viewpoint. Therefore, when a plurality of low resolution images are parallelized so that the plurality of low resolution images become parallel to a high resolution image, it is assumed that the position of a block in each of the plurality of parallelized low resolution images corresponds to the position of a block in a high resolution image.

Therefore, super-resolution image generator 415 can appropriately estimate the pixel component of a block in a high resolution image from a plurality of pixel components of a plurality of blocks specified in a plurality of parallelized low resolution images, without using a three-dimensional model.

Next, a description will be given of the aliasing component that is increased and decreased by the homography conversion using the homography matrix in parallelization.

Figure 13A:
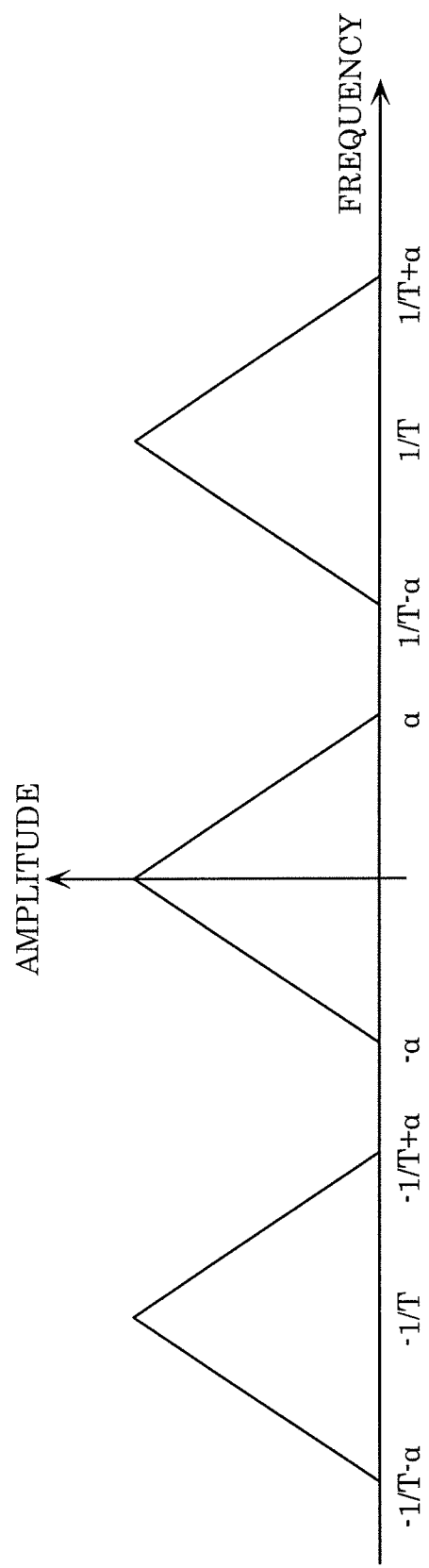
FIG. 13A is a graph showing a frequency spectrum in the state where aliasing has not occurred, according to an embodiment.
Figure 13B:
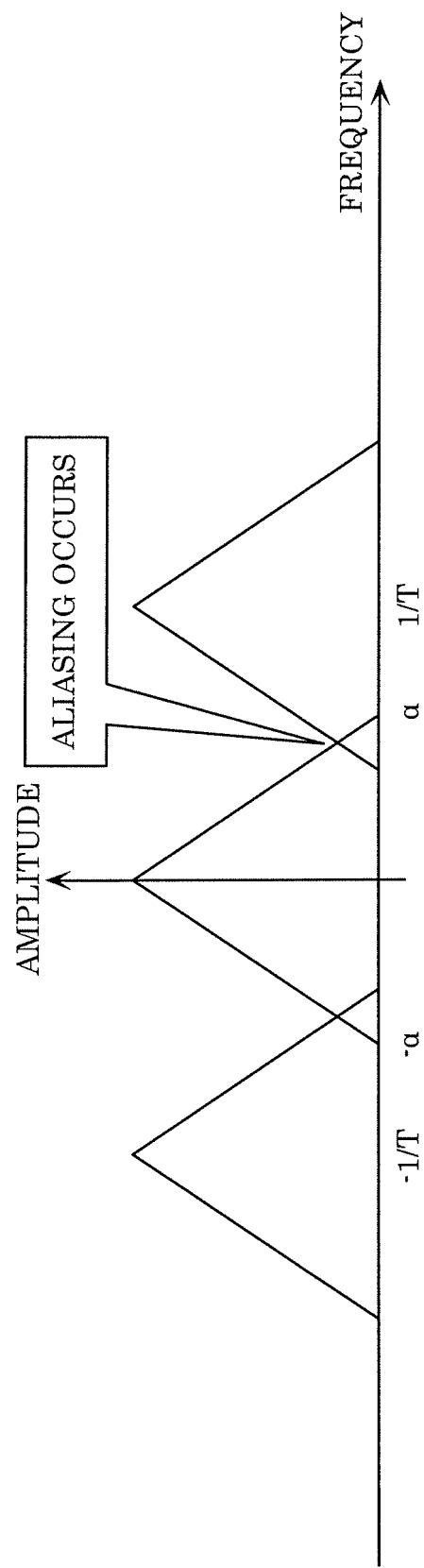
FIG. 13B is a graph showing a frequency spectrum in the state where aliasing has occurred, according to an embodiment.

FIG. 13A is a graph showing the frequency spectrum in the state where aliasing has not occurred. FIG. 13B is graph showing the frequency spectrum in the state where aliasing has occurred. In FIG. 13A and FIG. 13B, 1/T is a sampling frequency. FIG. 13A and FIG. 13B each show the frequency spectrum of a signal sampled at intervals of 1/T.

When the sampling frequency (1/T) of an image is smaller than twice the maximum frequency (α), in a frequency domain, as shown in FIG. 13B, the high frequency component of the sampling frequency is folded back to the low frequency component of the sampling frequency. This is called aliasing or fold-back distortion. When aliasing occurs, the structure to be sampled interferes in the image space.

The super-resolution effect differs depending on the magnitude of the aliasing component included in a low resolution image used as an input image. By compounding a plurality of aliasing components of a plurality of input images that are aligned to a sub-pixel accuracy, it becomes possible to perform the reconstruction of an image including the high frequency component exceeding the maximum frequency component of an input image. The processing of generating a high resolution image from a low resolution image is also called the reconstruction processing or the reconstruction-type super-resolution.

Figure 14:
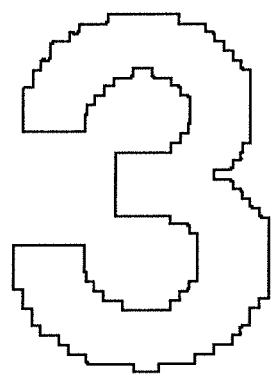
FIG. 14 is a diagram showing an image having a large generation amount of aliasing components according to an embodiment.

FIG. 14 is a diagram showing an example of an image having a large generation amount of aliasing components. The more the aliasing components are included in the low resolution image, the more improved the effect of the super-resolution processing becomes. That is, a higher frequency component can be reconstructed. However, the image with a lot of aliasing components has a lot of distortion components as shown in FIG. 14, it becomes difficult to perform alignment between images. Therefore, it is desirable to include well balanced aliasing components in terms of both the super-resolution and the alignment.

Figure 15:
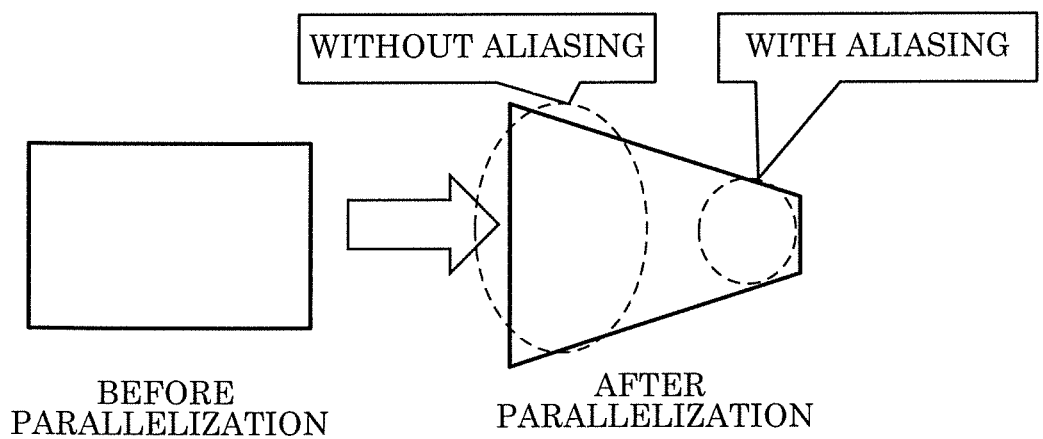
FIG. 15 is a diagram showing the relationship between parallelization and aliasing according to an embodiment.

FIG. 15 is a diagram showing the relationship between parallelization and aliasing. The image converted by the homography matrix in parallelization may include an area that is converted in the direction in which an original image is compressed and aliasing occurs as shown in FIG. 15, and an area that is converted in the direction in which the original image is extended and aliasing is decreased.

Parallelizer 414 may determine the reference for parallelization in order to generate a parallelized image including well balanced aliasing components in a predetermined area in which the super-resolution effect should be increased. For example, parallelizer 414 may evaluate the aliasing component included in a predetermined area in which the super-resolution effect should be increased in the case where parallelization is performed on the basis of the virtual camera, and in the case where parallelization is performed between the real cameras, and may select the reference for parallelization according to the evaluation result.

Then, parallelizer 414 may determine the reference view field direction for parallelizing a plurality of real viewpoint images, so that the generation amount of aliasing components is included in a predetermined range, and may parallelize the plurality of real viewpoint images so that the view field direction becomes parallel to the reference view field direction.

Additionally, after the parallelization of the real viewpoint images by parallelizer 414, super-resolution image generator 415 may use only an area with well-balanced aliasing for the super-resolution processing. That is, super-resolution image generator 415 may skip the super-resolution processing for a part of areas, and may partially generate a virtual viewpoint image with the same resolution as a real viewpoint image, as in image generator 413.

For example, in a plurality of reference areas in a plurality of parallelized real viewpoint images, when the generation amount of aliasing components is larger than a threshold value, super-resolution image generator 415 may estimate the pixel component of the processing target area in a virtual viewpoint image with high resolution, by performing the super-resolution processing. Then, in the plurality of reference areas in the plurality of parallelized real viewpoint images, when the generation amount of aliasing components is not larger than the threshold value, super-resolution image generator 415 may estimate the pixel component of the processing target area in a virtual viewpoint image, without performing the super-resolution processing.

In this manner, since the super-resolution processing is not performed in the areas in which the super-resolution effect is small, the calculation amount can be reduced.

Figure 16:
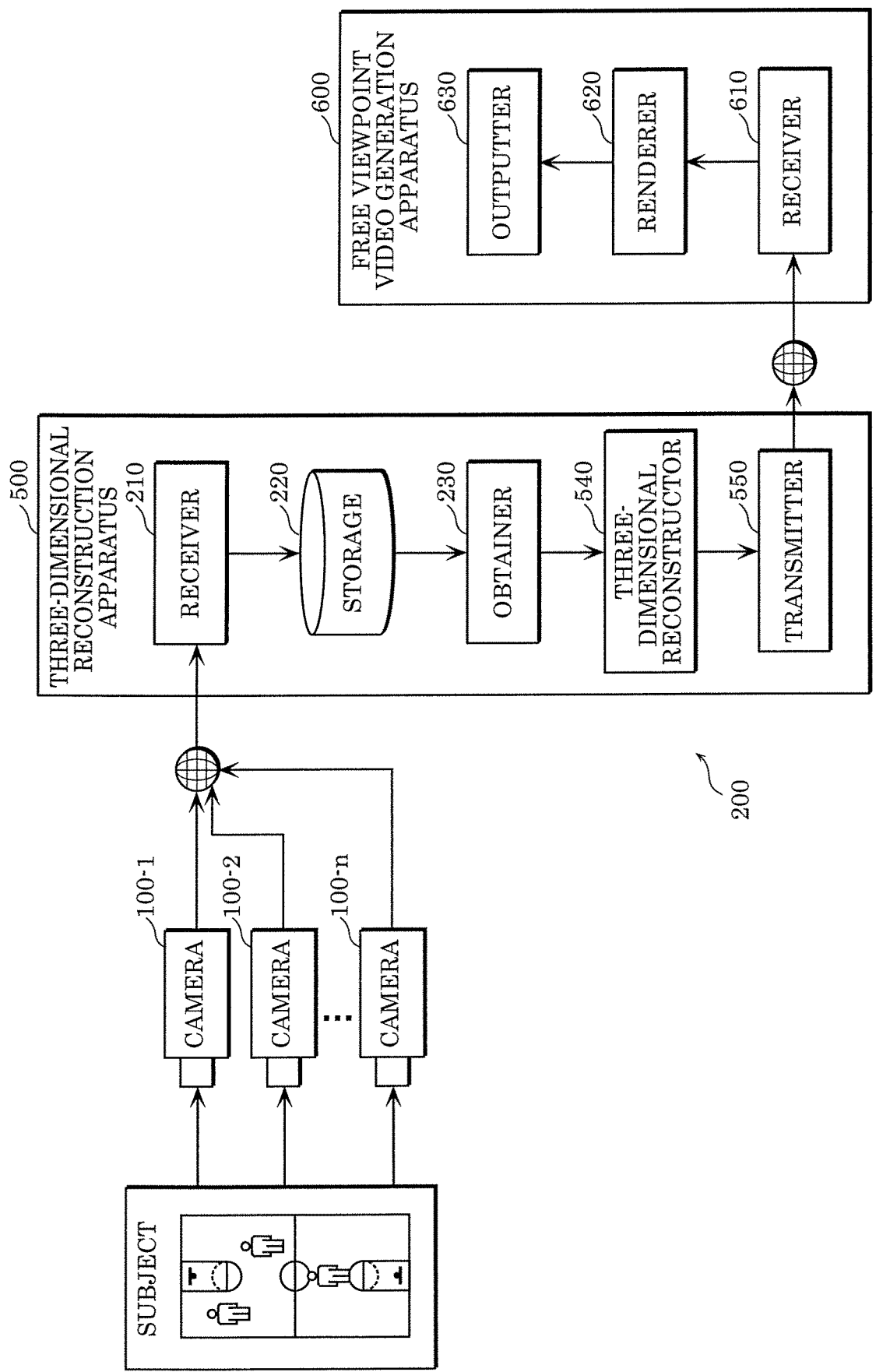
FIG. 16 is a block diagram showing the configuration of a modification of the free-viewpoint video generating system according to an embodiment.

FIG. 16 is a block diagram showing the configuration of a modification of free-viewpoint video generating system 200 shown in FIG. 4. Free-viewpoint video generating system 200 may separately include three-dimensional reconstruction apparatus 500 and free-viewpoint video generating apparatus 600 as shown in FIG. 16.

For example, three-dimensional reconstruction apparatus 500 operates as a server, estimates the camera parameters from a multi-viewpoint video, and reconstructs a three-dimensional model. Then, three-dimensional reconstruction apparatus 500 distributes the camera parameters, the three-dimensional model, and the multi-viewpoint video via a network.

Specifically, three-dimensional reconstruction apparatus 500 includes receiver 210, storage 220, obtainer 230, three-dimensional reconstructor 540, and transmitter 550. Receiver 210, storage 220, and obtainer 230 are the same components as the components shown in FIG. 4. Three-dimensional reconstructor 540 estimates the camera parameters from a multi-viewpoint video, and reconstructs a three-dimensional model. Transmitter 550 distributes the camera parameters, the three-dimensional model, and the multi-viewpoint video via the network.

Free-viewpoint video generating apparatus 600 operates as a client terminal, generates an arbitrary viewpoint video specified by the user as a free-viewpoint video based on information received from three-dimensional reconstruction apparatus 500, and displays the arbitrary viewpoint video generated as the free-viewpoint video.

Specifically, free-viewpoint video generating apparatus 600 includes receiver 610, renderer 620, and outputter 630. Receiver 610 receives information from three-dimensional reconstruction apparatus 500. Renderer 620 generates the arbitrary viewpoint video specified by the user as the free-viewpoint video based on the information received from three-dimensional reconstruction apparatus 500. Outputter 630 displays the arbitrary viewpoint video generated as the free-viewpoint video.

Additionally, the modification of free-viewpoint video generating system 200 is not limited to the above-described system. Three-dimensional reconstruction apparatus 500 and free-viewpoint video generating apparatus 600 may be further subdivided into a plurality of arithmetic devices. Then, the plurality of arithmetic devices may cooperate with each other on a network to generate a free-viewpoint video. This network may be the Internet, or may be a local network.

Additionally, the super-resolution processing of a real viewpoint image may be performed by using the real viewpoint image of a selected real camera, and the real viewpoint image of the real camera in the surrounding of the selected real camera. Then, the real viewpoint image obtained by the super-resolution processing as a high resolution image may be used for the rendering processing for generating a virtual viewpoint image. The processing process is shown in FIG. 17A and FIG. 17B.

Figure 17A:
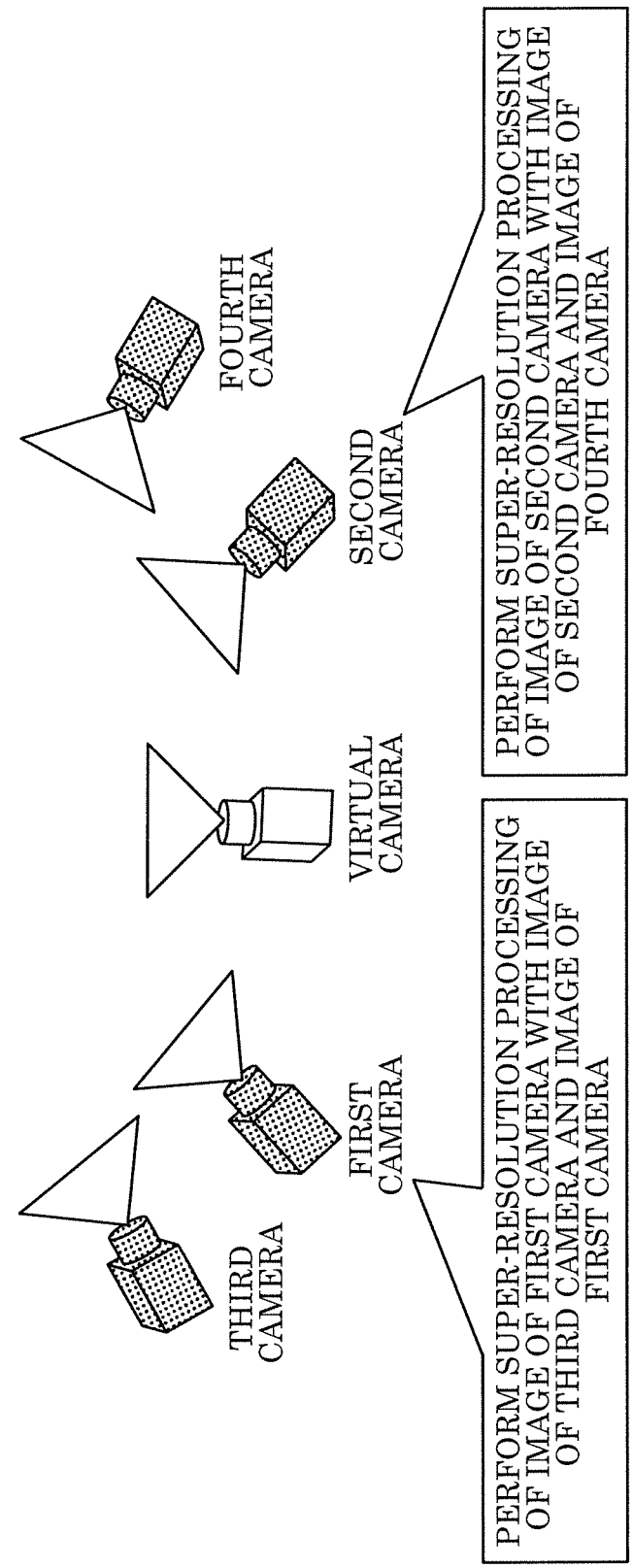
FIG. 17A is a diagram for describing resolution enhancement processing of a multi-viewpoint video according to an embodiment.
Figure 17B:
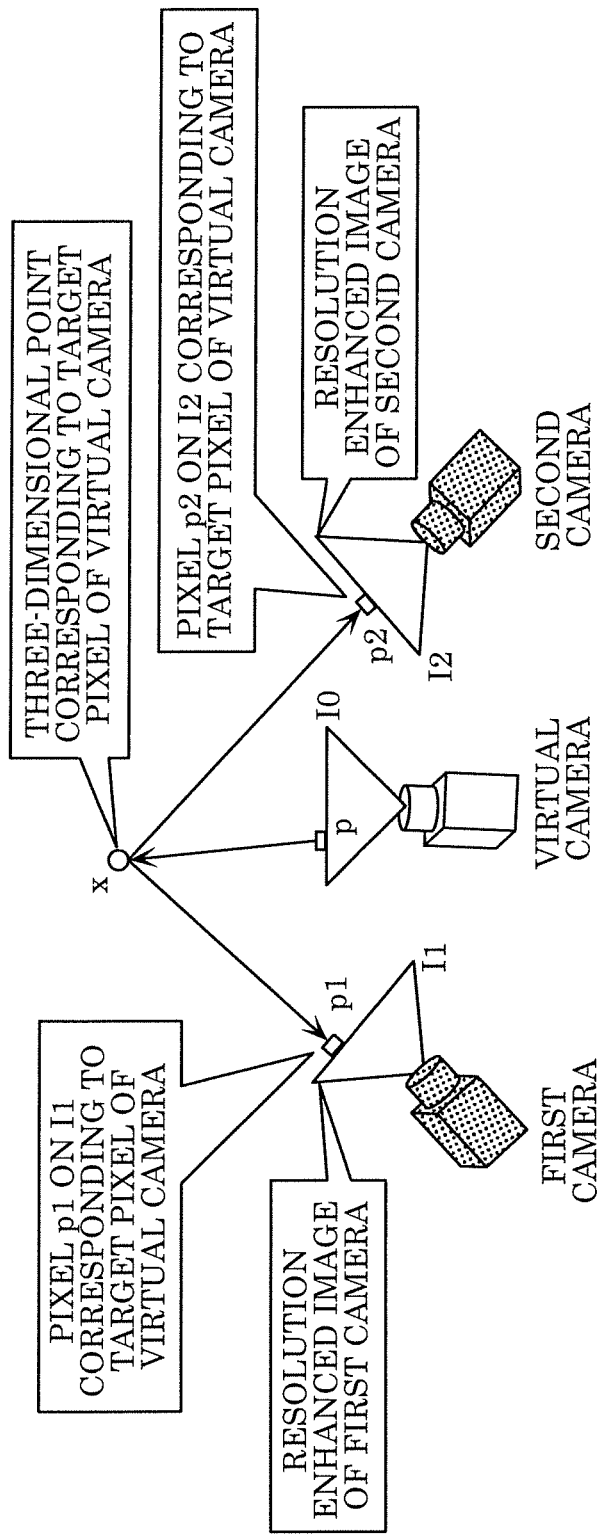
FIG. 17B is a diagram for describing a modification of free-viewpoint video generation processing according to an embodiment.

FIG. 17A is a diagram for describing the resolution enhancement processing of a multi-viewpoint video. In the example of FIG. 17A, parallelizer 414 parallelizes the real viewpoint image of first camera, and the real viewpoint image of third camera near first camera. Super-resolution image generator 415 performs the super-resolution processing of the real viewpoint image of first camera by performing the alignment on the two parallelized real viewpoint images. In this manner, super-resolution image generator 415 enhances the resolution of the real viewpoint image of first camera.

Note that the camera whose position and orientation are close to the position and orientation of first camera is selected as third camera. A plurality of cameras whose positions and orientations are close to the position and orientation of first camera may be selected, and may be used for super-resolution processing of the real viewpoint image of the first camera.

Similarly, parallelizer 414 parallelizes the real viewpoint image of second camera, and the real viewpoint image of fourth camera near second camera. Super-resolution image generator 415 performs the super-resolution processing of the real viewpoint image of second camera by performing the alignment of the two parallelized real viewpoint images. In this manner, super-resolution image generator 415 enhances the resolution of the real viewpoint image of second camera.

Note that the camera whose position and orientation are close to the position and orientation of second camera is selected as fourth camera. A plurality of cameras whose positions and orientations are close to the position and orientation of second camera may be selected, and may be used for the super-resolution processing of the real viewpoint image of second camera.

FIG. 17B is a diagram for describing the processing of generating a free-viewpoint video from a multi-viewpoint video whose resolution has been enhanced. The processing of generating a free-viewpoint video from a multi-viewpoint video whose resolution has been enhanced is performed according to the parallelization processing and the super-resolution processing, which were described with reference to FIG. 11A, FIG. 11B, and FIG. 12. However, in the parallelization processing and the super-resolution processing, a multi-viewpoint video whose resolution has been enhanced is used.

That is, the real viewpoint image of first camera and the real viewpoint image of second camera have already been subjected to the super-resolution processing. Therefore, in the rendering of a virtual viewpoint image, the pixel value of the generation target pixel p may be calculated by the weighting sum or the average value, etc. of the two pixel values of the two pixels p1 and p2 corresponding to the generation target pixel p included in the virtual viewpoint image. Alternatively, the high resolution image of first camera and the high resolution image of second camera may be parallelized, and the super-resolution processing may be further performed.

Additionally, in the rendering, a virtual viewpoint image may be generated in the unit of pixels as described above. Alternatively, a virtual viewpoint image may be generated in the unit of blocks of a small area.

Additionally, even when three or more real cameras are selected, and a virtual viewpoint image is generated from three or more real viewpoint images, the rendering may be similarly performed by using a high resolution image obtained by the super-resolution processing that uses the real viewpoint images of cameras near the respective real cameras. Furthermore, in the rendering, the super-resolution processing may be further performed. In this case, a high resolution image is obtained in advance as a real viewpoint image by the super-resolution processing. Then, the high resolution image is used as an input image, and the rendering processing accompanied by the super-resolution processing is performed.

Additionally, the resolution enhancement of a real viewpoint image may be performed in the real camera that photographed the real viewpoint image. For example, first camera may obtain the real viewpoint image of nearby third camera, and may perform the super-resolution processing of the real viewpoint image of first camera.

Figure 18A:
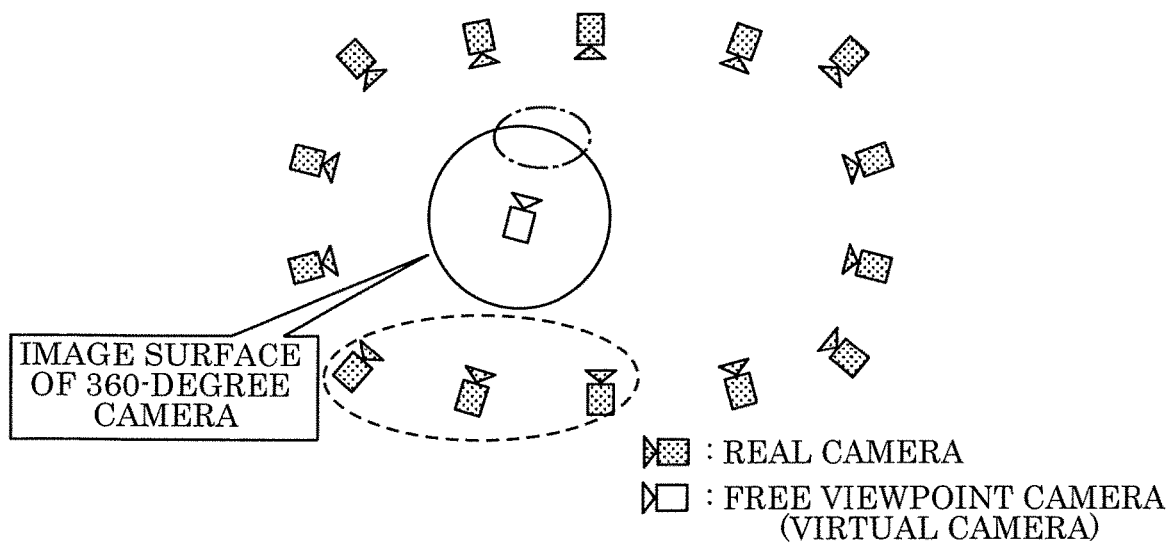
FIG. 18A is a diagram showing Example 1 of a 360-degree virtual camera according to an embodiment.
Figure 18B:
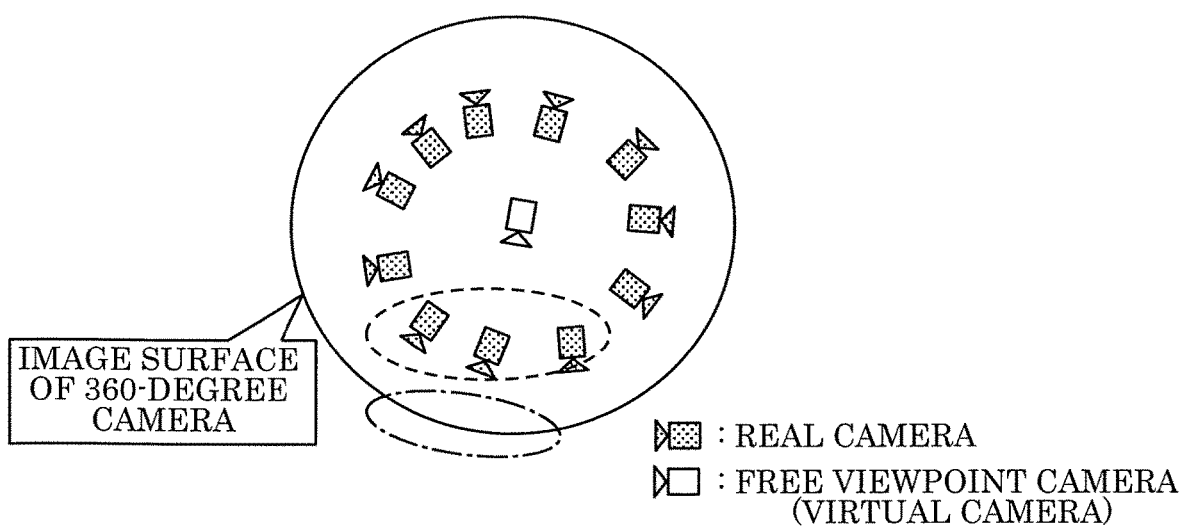
FIG. 18B is a diagram showing Example 2 of the 360-degree virtual camera according to an embodiment.

Additionally, the virtual camera is not limited to a camera with a rectangular image surface, and may be a 360-degree camera. Examples of the positional relationship between a plurality of real cameras and the virtual camera in the case where the virtual camera is a 360-degree camera are shown in FIG. 18A and FIG. 18B. Although the virtual camera is shown in the same shape as the real camera for convenience in FIG. 18A and FIG. 18B, in these examples, the virtual camera is a 360-degree camera to which the omnidirectional mirror is virtually connected.

FIG. 18A is a diagram showing an example of the arrangement of a plurality of real cameras and the virtual camera in the case where a subject exists inside a plurality of real cameras. In FIG. 18A, the area enclosed with a one-dot-chain line is the area corresponding to the overlapping area of the visual fields of three real cameras surrounded with a broken line, and is an area on the image surface of the 360-degree camera. In order to calculate the pixel value of this area, the three images of the three real cameras surrounded with the broken line are parallelized, and the super-resolution processing is performed for each small area including the corresponding pixel of the real camera corresponding to a generation target pixel of the virtual camera.

Additionally, after a flat super-resolution image is generated in all of the overlapping areas of the three cameras, projection conversion of the flat super-resolution image may be performed onto the part corresponding to the overlapping areas of the image surface of the 360-degree camera.

Any of the above-described kinds of processing is repeated until all the pixel values on the image surface of the 360-degree camera are calculated. Alternatively, any of the above-described kinds of processing is repeated in each of the overlapping areas of all of the groups each formed by a group of two or more real cameras. Here, one real camera may belong to a plurality of groups.

FIG. 18B is a diagram showing an example of the arrangement of a plurality of real cameras and the virtual camera in the case where the subject exists outside of the plurality of real cameras. Also in this case, similar to the example of FIG. 18A, a plurality of groups each formed by a group of two or more real cameras may be created, and the super-resolution processing may be performed in the rendering processing of the image of the 360-degree camera. Additionally, after the super-resolution processing of a real viewpoint image is performed, the image of a 360-degree camera may be generated by using the real viewpoint image with high resolution.

Additionally, the real camera is not limited to a fixed camera, and may be a moving camera. The real camera may be a personal digital assistant, such as a smart phone carrying a camera. In addition, noise rejection may be performed, or deteriorated texture may be corrected by using a plurality of blocks in which alignment is performed with a sub-pixel accuracy.

Additionally, the area in which the super-resolution processing is performed of a virtual viewpoint image may be a subject attracting attention, such as a player holding a ball in a sport scene, or a singer singing a song in an event. Alternatively, the area in which the super-resolution processing is performed may be a corporate logo or an advertisement of a sponsor of an event, etc.

Additionally, the super-resolution processing may be performed by using, as an input, a plurality of images photographed with a personal digital assistant, such as a smart phone carrying a plurality of cameras. In addition, similarly, a plurality of images photographed by a vehicle or an airplane carrying a plurality of cameras may be used as an input.

Note that the scene on which the super-resolution processing is performed is not limited to an event related to entertainment, such as sports. For example, many cameras may be installed in an institution for maintenance of cars and airplanes, etc. Then, at the time of performing inspection and maintenance, parts of interest may be subjected to resolution enhancement by the super-resolution processing, and may be checked.

Additionally, traffic accident data may be recorded by photographing traffic accident spots from multiple viewpoints. Then, at a later date, at the time of performing verification, parts of interest may be subjected to resolution enhancement by the super-resolution processing, and may be checked.

Figure 19A:
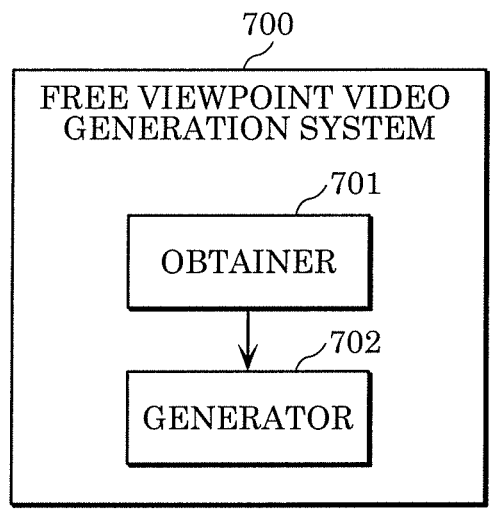
FIG. 19A is a block diagram showing the characteristic configuration of a free-viewpoint video generating system according to an embodiment.

FIG. 19A is a block diagram showing the characteristic configuration of a free-viewpoint video generating system according to the present embodiment. Free-viewpoint video generating system 700 shown in FIG. 19A includes obtainer 701 and generator 702. Obtainer 701 and generator 702 of free-viewpoint video generating system 700 correspond to obtainer 230 and generator 240, etc. of free-viewpoint video generating system 200. Each component of free-viewpoint video generating system 700 may be formed by a general-purpose electric circuit or an exclusive electric circuit.

Figure 19B:
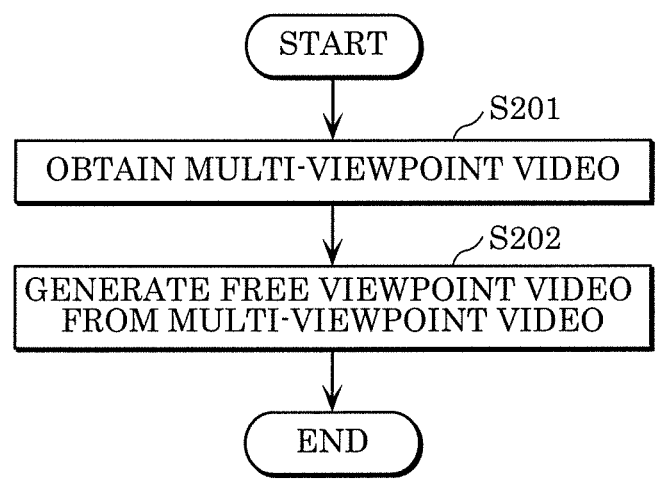
FIG. 19B is a flowchart showing the characteristic operation of a free-viewpoint video generating system according to an embodiment.

FIG. 19B is a flowchart showing the characteristic operation of free-viewpoint video generating system 700 shown in FIG. 19A. First, obtainer 701 obtains a multi-viewpoint video including N videos of N viewpoints (S201). Here, N is an integer equal to or greater than 2. Then, generator 702 generates a free-viewpoint video, which is a video of a virtual viewpoint different from the N viewpoints, from the obtained multi-viewpoint video (S202).

For example, generator 702 may specify N reference areas corresponding to the processing target area in the free-viewpoint video in N videos by using a three-dimensional model generated from N videos. Then, generator 702 may estimate the pixel component of the processing target area in the free-viewpoint video with a predetermined resolution higher than each of the resolutions of the N reference areas, from N pixel components of the N reference areas in the N videos. Then, generator 702 may generate a video constructed by the estimated pixel components as a free-viewpoint video.

In this manner, free-viewpoint video generating system 700 can appropriately specify a plurality of reference areas corresponding to the processing target area by using the three-dimensional model. Then, free-viewpoint video generating system 700 can appropriately estimate the pixel component of the processing target area with high resolution, from a plurality of pixel components of a plurality of reference areas. Therefore, free-viewpoint video generating system 700 can appropriately generate the free-viewpoint video with high resolution from a plurality of videos of various viewpoints.

Additionally, for example, generator 702 may specify a three-dimensional area corresponding to the processing target area in the three-dimensional model, and may specify N reference areas corresponding to the three-dimensional area in N videos. In this manner, free-viewpoint video generating system 700 can appropriately specify the three-dimensional area corresponding to the processing target area in the three-dimensional model. Then, free-viewpoint video generating system 700 can appropriately specify a plurality of reference areas corresponding to the three-dimensional area in a plurality of videos included in the multi-viewpoint video.

Additionally, for example, generator 702 may upsample the N videos to a sub-pixel accuracy. Then, generator 702 may specify N reference areas corresponding to the processing target area with a sub-pixel accuracy in the upsampled N videos. Then, generator 702 may estimate the pixel component of the processing target area from N pixel components of N reference areas in the upsampled N videos.

In this manner, free-viewpoint video generating system 700 can appropriately specify a plurality of reference areas corresponding to the processing target area with a sub-pixel accuracy. Then, free-viewpoint video generating system 700 can appropriately estimate the pixel component of the processing target area with high resolution from a plurality of pixel components of a plurality of reference areas in a plurality of videos upsampled to a sub-pixel accuracy.

Additionally, for example, the N videos may be N videos of N viewpoints of N cameras. Then, the free-viewpoint video may be a video of a virtual viewpoint of the virtual camera.

Then, generator 702 may estimate N camera parameters of N cameras from N videos. Then, generator 702 may generate a three-dimensional model from N videos by using the N camera parameters. Generator 702 may specify N reference areas corresponding to the processing target area by using a three-dimensional model, the N camera parameters, and the camera parameters of the virtual camera.

In this manner, free-viewpoint video generating system 700 can appropriately specify a plurality of reference areas corresponding to a processing target area by using a three-dimensional model, a plurality of camera parameters, etc.

Additionally, for example, generator 702 may parallelize N videos included in the obtained multi-viewpoint video by converting the N videos included in the obtained multi-viewpoint video into N videos with parallel view field directions. Then, generator 702 may specify N reference areas corresponding to the processing target area in the N parallelized videos. Then, generator 702 may estimate the pixel component of the processing target area from N pixel components of N reference areas in the N parallelized videos.

In this manner, free-viewpoint video generating system 700 can arrange the forms of a plurality of pixel components of a plurality of reference areas. Therefore, free-viewpoint video generating system 700 can efficiently estimate the pixel component of a processing target area from a plurality of pixel components of a plurality of reference areas.

Additionally, for example, generator 702 may parallelize the N videos included in the obtained multi-viewpoint video by converting N videos included in the obtained multi-viewpoint video into N videos with parallel view field directions with respect to the view field direction of a virtual viewpoint.

In this manner, free-viewpoint video generating system 700 can arrange the forms of a plurality of pixel components of a plurality of reference areas with the forms similar to the forms of the pixel component of the processing target area. Therefore, free-viewpoint video generating system 700 can efficiently estimate the pixel component of a processing target area from a plurality of pixel components of a plurality of reference areas.

Additionally, for example, generator 702 may determine the reference view field direction for parallelizing N videos included in the obtained multi-viewpoint video, so that the generation amount of the aliasing component in the N parallelized videos may be included in a predetermined range. Then, generator 702 may parallelize N videos by converting the N videos included in the obtained multi-viewpoint video into N videos with parallel view field directions with respect to the reference view field direction.

In this manner, free-viewpoint video generating system 700 can determine the reference view field direction for parallelization, according to the generation amount of an aliasing component. Therefore, free-viewpoint video generating system 700 can parallelize a plurality of videos, so that the pixel component of a processing target area may be appropriately estimated with high resolution.

Additionally, for example, when the generation amount of an aliasing component in N reference areas in N parallelized videos is larger than a threshold value, generator 702 may estimate the pixel component of a processing target area with a predetermined resolution. Then, when the generation amount of the aliasing component in the N reference areas is not larger than the threshold value, generator 702 may estimate the pixel component of the processing target area with a resolution lower than the predetermined resolution.

In this manner, when it is possible to appropriately estimate the pixel component of a processing target area with high resolution, the pixel component of the processing target area is estimated with high resolution. Therefore, free-viewpoint video generating system 700 can efficiently perform estimation.

Additionally, for example, the multi-viewpoint video obtained by obtainer 701 may include M videos including N videos. Here, M is an integer equal to or greater than N. The M videos may be videos of M viewpoints of M cameras. The free-viewpoint video may be the video of a virtual viewpoint of a virtual camera. Then, generator 702 may select N videos from the M videos by using M camera parameters of M cameras, and the camera parameters of a virtual camera.

In this manner, free-viewpoint video generating system 700 can use appropriate videos for the processing for generating a free-viewpoint video with high resolution among a plurality of videos included in a multi-viewpoint video. Therefore, free-viewpoint video generating system 700 can appropriately generate a free-viewpoint video.

Additionally, for example, generator 702 may estimate the pixel component of a processing target area from N pixel components of N reference areas by using the MAP method, the IBP method, or the POCS method. In this manner, free-viewpoint video generating system 700 can appropriately estimate the pixel component of the processing target area with high resolution from a plurality of pixel components of a plurality of reference areas.

Additionally, for example, generator 702 may parallelize N videos included in the obtained multi-viewpoint video by converting N videos included in the obtained multi-viewpoint video into N videos with parallel view field directions. Then, generator 702 may specify N reference areas which fit to each other in the N parallelized videos by performing block matching on the N parallelized videos.

Then, generator 702 may estimate the pixel component of the processing target area corresponding to N reference areas in a free-viewpoint video with a predetermined resolution higher than each of the resolutions of the N reference areas from N pixel components of the N reference areas. Then, generator 702 may generate the free-viewpoint video constructed by the estimated pixel component.

In this manner, free-viewpoint video generating system 700 can appropriately perform block matching in a plurality of parallelized videos. Therefore, free-viewpoint video generating system 700 can appropriately specify a plurality of reference areas in a plurality of videos. Then, free-viewpoint video generating system 700 can appropriately estimate the pixel component of a processing target area with high resolution from a plurality of pixel components of a plurality of reference areas.

Therefore, free-viewpoint video generating system 700 can appropriately generate a free-viewpoint video with high resolution from a plurality of videos of various viewpoints.

Note that the above-described video can be read as an image. Additionally, the area may be an area corresponding to one pixel, or may be an area corresponding to a plurality of pixels. The camera parameters may include the position and orientation of a camera. Additionally, the configuration of free-viewpoint video generating system 700 may be combined with the configuration of free-viewpoint video generating system 200.

Furthermore, each of the structural components may be configured using dedicated hardware, or may be implemented by general-purpose hardware executing a software program suitable for the structural component. For example, each of the structural components may be implemented by means of a program executer, such as a CPU or a processor, reading and executing the software program recorded on a recording medium such as a hard disk or a semiconductor memory.

Specifically, the above-described free-viewpoint video generating system may include processing circuitry and storage that is electrically connected to the processing circuitry and can be accessed by the processing circuitry.

The processing circuitry includes at least one of dedicated hardware and a program executer, and executes a process using the storage. Furthermore, in the case where the processing circuitry includes a program executer, the storage stores a software program that is executed by the program executer.

Here, the software program for implementing the above-described free-viewpoint video generating system is a program as described below.

Specifically, the program causes a computer to execute a free-viewpoint video generating method that includes: obtaining a multi-viewpoint video including N videos of N viewpoints, where N is an integer equal to or greater than 2; and generating a free-viewpoint video from the obtained multi-viewpoint video, the free-viewpoint video being a video of a virtual viewpoint different from the N viewpoints, wherein in the generating: N reference areas corresponding to a processing target area in the free-viewpoint video are specified in the N videos by using a three-dimensional model generated from the N videos; a pixel component of the processing target area in the free-viewpoint video is estimated with a predetermined resolution higher than respective resolutions of the N reference areas, from N pixel components of the N reference areas in the N videos; and a video constructed by the estimated pixel component is generated as the free-viewpoint video.

Alternatively, the program may cause a computer to execute a free-viewpoint video generating method that includes: obtaining a multi-viewpoint video including N videos of N viewpoints, where N is an integer equal to or greater than 2; and generating a free-viewpoint video from the obtained multi-viewpoint video, the free-viewpoint video being a video of a virtual viewpoint different from the N viewpoints, wherein in the generating: the N videos included in the obtained multi-viewpoint video are parallelized by converting the N videos included in the obtained multi-viewpoint video into N videos with parallel view field directions; N reference areas that fit to each other in the N parallelized videos are specified by performing block matching on the N parallelized videos; a pixel component of a processing target area corresponding to the N reference areas is estimated in the free-viewpoint video with a predetermined resolution higher than respective resolutions of the N reference areas, from N pixel components of the N reference areas; and the free-viewpoint video constructed by the estimated pixel component is generated.

Furthermore, as described above, each of the structural components may be a circuit. These circuits as a whole may compose a single circuit or may be individual circuits. Moreover, each of the structural components may be implemented by a general-purpose processor or a dedicated processor.

Furthermore, a process executed by a specific structural component may be executed by a different structural component. Moreover, the order in which processes are executed may be changed, and a plurality of processes may be executed in parallel.

Additionally, the ordinal numbers used for the description, such as the first and the second, may be changed as appropriate. Additionally, an ordinal number may newly be provided to or may be removed from a structural component, etc.

Although aspects of the free-viewpoint video generating system have been described on the basis of the embodiments, the aspects of the free-viewpoint video generating system is not limited to such embodiments. Forms obtained by making various modifications to the above embodiments that can be conceived by those skilled in the art, as well as forms obtained by combining structural components in different embodiments, without materially departing from the spirit of the present disclosure, may thus be included in the scope of the aspects of the free-viewpoint video generating system.

What is claimed is:

1. A free-viewpoint video generating method comprising:
obtaining a multi-viewpoint video including N videos of N viewpoints, N being an integer greater than 1; and
generating a free-viewpoint video of a virtual viewpoint based on the multi viewpoint video such that the free-viewpoint video shows target areas and has a first resolution higher than each of resolutions of the N videos, the virtual viewpoint being different from the N viewpoints, for each target area, in order to achieve the first resolution higher than each of the resolutions of the N videos, the generating comprising:
referring to a three-dimensional model generated based on the N videos to specify N reference areas which are shown by the N videos and which correspond to the each target area in the free-viewpoint video; and
calculating components of pixels to represent the each target area in the free-viewpoint video, based on components of pixels to represent the N reference areas in the N videos, wherein for each target area, the generating further comprises:
specifying a three-dimensional area in the three-dimensional model, the three-dimensional area corresponding to the each target area;
specifying the N reference areas with sub-pixel accuracy such that the N reference areas each correspond to the three-dimensional area, wherein, in the generating, the N videos included in the multi-viewpoint video are parallelized by converting the N videos included in the multi-viewpoint video into N videos with parallel view field directions, the N reference areas corresponding to the each target area are specified in the N parallelized videos, the components of the pixels to represent the each target area are calculated based on the components of the pixels to represent the N reference areas in the N parallelized videos, and the N videos included in the multi-viewpoint video are parallelized by converting the N videos included in the multi-viewpoint video into N videos with parallel view field directions with respect to a view field direction of the virtual viewpoint; and
converting the each target area in frequency to perform Phase Only Correlation (POC) when the N reference areas are specified with sub-pixel accuracy.

2. The free-viewpoint video generating method according to claim 1,
wherein, in the generating,
the N videos are upsampled to sub-pixel accuracy,
the N reference areas corresponding to the each target area are specified with sub-pixel accuracy in the upsampled N videos, and
the components of the pixels to represent the each target area are calculated based on the components of the pixels to represent the N reference areas in the upsampled N videos.

3. The free-viewpoint video generating method according to claim 1,
wherein the N videos are N videos of N viewpoints of N cameras,
the free-viewpoint video is a video of a virtual viewpoint of a virtual camera, and
in the generating,
N camera parameters of the N cameras are calculated based on the N videos,
the three-dimensional model is generated based on the N videos by using the N camera parameters, and
the N reference areas corresponding to the each target area are specified by using the three-dimensional model, the N camera parameters, and a camera parameter of the virtual camera.

4. The free-viewpoint video generating method according to claim 1,
wherein, in the generating,
a reference view field direction for parallelizing the N videos included in the multi-viewpoint video is determined so that a generation amount of an aliasing component in the N parallelized videos is included in a predetermined range, and
the N videos are parallelized by converting the N videos included in the multi-viewpoint video into N videos with parallel view field directions with respect to the reference view field direction.

5. The free-viewpoint video generating method according to claim 1,
wherein, in the generating,
when a generation amount of an aliasing component in the N reference areas in the N parallelized videos is larger than a threshold value, the components of the pixels to represent the each target area are calculated with the first resolution, and
when the generation amount of the aliasing component in the N reference areas is not larger than the threshold value, the components of the pixels to represent the each target area are calculated with a resolution lower than the first resolution.

6. The free-viewpoint video generating method according to claim 1,
wherein the multi-viewpoint video includes M videos including the N videos, where M is an integer greater than N,
the M videos are videos of M viewpoints of M cameras,
the free-viewpoint video is a video of a virtual viewpoint of a virtual camera, and
in the generating, the N videos are selected from the M videos by using M camera parameters of the M cameras, and a camera parameter of the virtual camera.

7. The free-viewpoint video generating method according to claim 1,
wherein, in the generating, the components of the pixels to represent the each target area are calculated based on the components of the pixels to represent the N reference areas by using from a selected group consisting of a maximum a posteriori (MAP) method, an iterative back projection (IBP) method, and a projection onto convex set (POCS) method.

8. The free-viewpoint video generating method according to claim 1,
wherein each of the target areas corresponds to a block constituted with pixels.

9. A free-viewpoint video generating method comprising:
obtaining a multi-viewpoint video including N videos of N viewpoints, N being an integer greater than 1, the N videos having been captured by N cameras;
calculating N camera parameters of the N cameras based on the N videos; and
generating a free-viewpoint video of a virtual viewpoint based on the multi-viewpoint video such that the free-viewpoint video shows target areas and has a first resolution higher than each of resolutions of the N videos, the virtual viewpoint being different from the N viewpoints, for each target area, in order to achieve the first resolution higher than each of the resolutions of the N videos, the generating comprising:
converting the N videos to N parallelized videos based on the N camera parameters such that the N parailelized videos have view field directions that are parallel to each other;
performing block matching on the N parallelized videos to specify N reference areas that fit to each other in the N parallelized videos, the N reference areas each corresponding to the each target area;
calculating components of pixels in the free-viewpoint video to represent the each target area based on components of pixels of the N reference areas; and
converting the each target area in frequency to perform Phase Only Correlation (POC) when the N reference areas are specified with sub-pixel accuracy.

10. A free-viewpoint video generating system comprising:
a memory; and
a circuit configured to perform:
obtaining a multi-viewpoint video including N videos of N viewpoints, N being an integer greater than 1; and
generating a free-viewpoint video of a virtual viewpoint based on the multi-viewpoint video such that the free-viewpoint video shows target areas and has a first resolution higher than each of resolutions of the N videos, the virtual viewpoint being different from the N viewpoints, for each target area, in order to achieve the first resolution higher than each of the resolutions of the N videos, the generating comprising:
referring to a three-dimensional model generated based on the N videos to specify N reference areas which are shown by the N videos and which correspond to the each target area in the free-viewpoint video; and
calculating components of pixels to represent the each target area in the free-viewpoint video, based on components of pixels to represent the N reference areas in the N videos, wherein for each target area, the generating further comprises:
specifying a three-dimensional area in the three-dimensional model, the three-dimensional area corresponding to the each target area;
specifying the N reference areas with sub-pixel accuracy such that the N reference areas each correspond to the three-dimensional area, wherein, in the generating, the N videos included in the multi-viewpoint video are parallelized by converting the N videos included in the multi-viewpoint video into N videos with parallel view field directions, the N reference areas corresponding to the each target area are specified in the N parallelized videos, the components of the pixels to represent the each target area are calculated based on the components of the pixels to represent the N reference areas in the N parallelized videos, and the N videos included in the multi-viewpoint video are parallelized by converting the N videos included in the multi-viewpoint video into N videos with parallel view field directions with respect to a view field direction of the virtual viewpoint; and
converting the each target area in frequency to perform Phase Only Correlation (POC) when the N reference areas are specified with sub-pixel accuracy.

11. A free-viewpoint video generating system comprising:
a memory; and
a circuit configured to perform:
obtaining a multi-viewpoint video including N videos of N viewpoints, N being an integer greater than 1, the N videos having been captured by N cameras;
calculating N camera parameters of the N cameras based on the N videos; and
generating a free-viewpoint video of a virtual viewpoint based on the multi-viewpoint video such that the free-viewpoint video shows target areas and has a first resolution higher than each of resolutions of the N videos, the virtual viewpoint being different from the N viewpoints, for each target area, in order to achieve the first resolution higher than each of the resolutions of the N videos, the generating comprising:

converting the N videos to N parailelized videos based on the N camera parameters such that the N parallelized videos have view field directions that are parallel to each other;

performing block matching on the N parallelized videos to specify N reference areas that fit to each other in the N parallelized videos, the N reference areas each corresponding to the each target area;

calculating components of pixels in the free-viewpoint video to represent the each target area based on components of pixels of the N reference areas; and converting the each target area in frequency to perform Phase Only Correlation (POC) when the N reference areas are specified with sub-pixel accuracy.

* * * * *